United States Patent
Humphries

(10) Patent No.: US 9,124,763 B2
(45) Date of Patent: Sep. 1, 2015

(54) METHOD AND APPARATUS FOR PROVIDING BOTH AUDIO/VIDEO VISITATION AND VOIP TELEPHONIC VISITATION ORIGINATED EITHER BY AN INMATE OR BY AN OUTSIDE VISITOR DIRECTLY BETWEEN INMATES OF A PRISON AND AN OUTSIDE VISITOR WITHOUT NEED OF INTERVENTION BY PRISON PERSONNEL

(71) Applicant: HomeWAV, LLC, St. Louis, MO (US)

(72) Inventor: Gary James Humphries, Virginia Beach, VA (US)

( * ) Notice: Subject to any disclaimer, the term of this patent is extended or adjusted under 35 U.S.C. 154(b) by 146 days.

(21) Appl. No.: 13/771,053

(22) Filed: Feb. 19, 2013

(65) Prior Publication Data

US 2013/0194377 A1    Aug. 1, 2013

Related U.S. Application Data

(63) Continuation-in-part of application No. 13/363,498, filed on Feb. 1, 2012.

(51) Int. Cl.

| | |
|---|---|
| *H04N 7/14* | (2006.01) |
| *H04M 15/00* | (2006.01) |
| *H04N 7/15* | (2006.01) |
| *H04M 3/22* | (2006.01) |
| *H04M 3/38* | (2006.01) |
| *H04M 7/00* | (2006.01) |
| *H04L 29/06* | (2006.01) |

(Continued)

(52) U.S. Cl.
CPC .............. *H04N 7/15* (2013.01); *H04L 65/1069* (2013.01); *H04L 65/1096* (2013.01); *H04L 65/403* (2013.01); *H04M 3/2218* (2013.01); *H04M 3/2281* (2013.01); *H04M 3/38* (2013.01); *H04M 7/00* (2013.01); *H04M 7/006* (2013.01); *H04M 15/08* (2013.01); *H04M 15/09* (2013.01); *H04M 17/20* (2013.01); *H04N 7/147* (2013.01); *H04M 2201/50* (2013.01)

(58) Field of Classification Search
CPC ......... H04N 7/147; H04N 7/15; H04N 7/141; H04M 3/38; H04M 15/08
USPC .......... 379/114.2, 114.21, 114.23; 348/14.01, 348/14.02
See application file for complete search history.

(56) References Cited

U.S. PATENT DOCUMENTS

| | | |
|---|---|---|
| 4,054,756 A | 10/1977 | Commella et al. |
| 5,382,972 A | 1/1995 | Kannes |

(Continued)

*Primary Examiner* — Quoc D Tran
(74) *Attorney, Agent, or Firm* — David L. Banner

(57) ABSTRACT

An Internet-based audio/video and VoIP telephone visitation system for prisons wherein audio/video and VoIP visitation may be originated by either an inmate or an outside visitor. An inmate uses an individual portable electronic device in his/her possession to communicate exclusively with the visitation system. Through the visitation system video messages, video visitations, and VoIP telecommunications may be exchanged between the inmate and a registered visitor having an Internet-enabled device. Communication requires no endpoint control by prison personnel. All communications may be subject to intervention, recordation, and monitoring by prison personnel. Payment for services is prepaid by visitors using an on-line payment service eliminating involvement of prison personnel. All non-privileged calls are recorded. All calls may be monitored. A fee-per-minute is charged. Time is tracked for each call. The call duration and time remaining for a call may be displayed for both the visitor and the inmate.

10 Claims, 19 Drawing Sheets

(51) Int. Cl.
*H04M 15/08* (2006.01)
*H04M 17/00* (2006.01)

(56) References Cited

U.S. PATENT DOCUMENTS

| | | | |
|---|---|---|---|
| 6,844,893 | B1 | 1/2005 | Miller et al. |
| 7,046,779 | B2 | 5/2006 | Hesse |
| 7,061,521 | B2 | 6/2006 | Bulriss et al. |
| 7,158,621 | B2 | 1/2007 | Bayne |
| 7,256,816 | B2 | 8/2007 | Profanchik et al. |
| 8,064,580 | B1 | 11/2011 | Apple et al. |
| 8,099,080 | B1 * | 1/2012 | Rae et al. ................ 455/411 |
| 8,160,219 | B2 | 4/2012 | Bayne |
| 2008/0000966 | A1 * | 1/2008 | Keiser ................ 235/382 |
| 2009/0228383 | A1 | 9/2009 | Martinez et al. |
| 2012/0262271 | A1 * | 10/2012 | Torgersrud et al. ........ 340/5.53 |
| 2013/0058469 | A1 * | 3/2013 | Gongaware et al. ...... 379/93.03 |

* cited by examiner

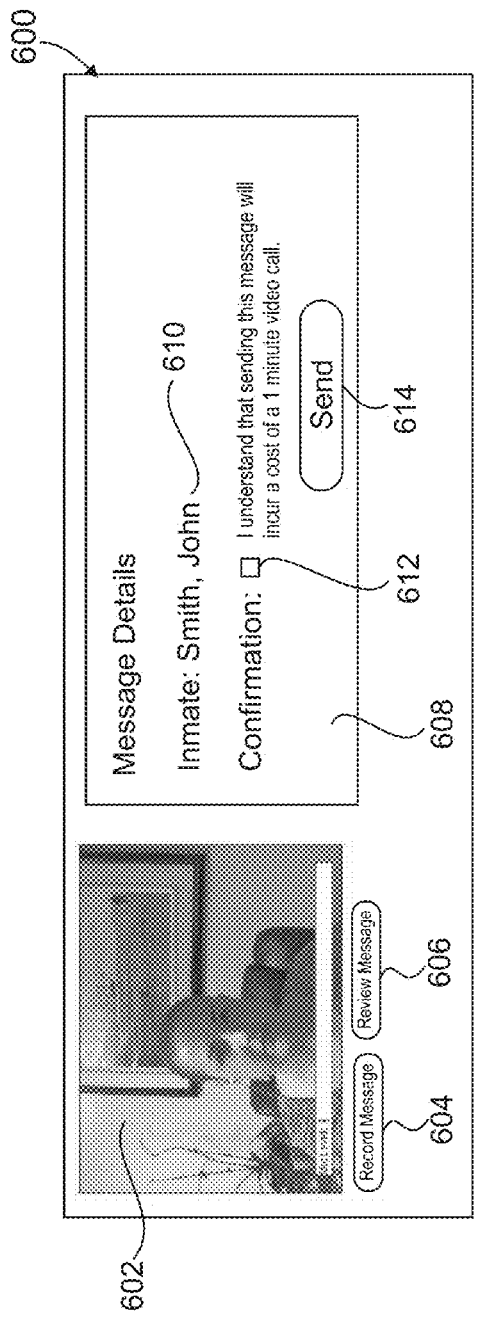

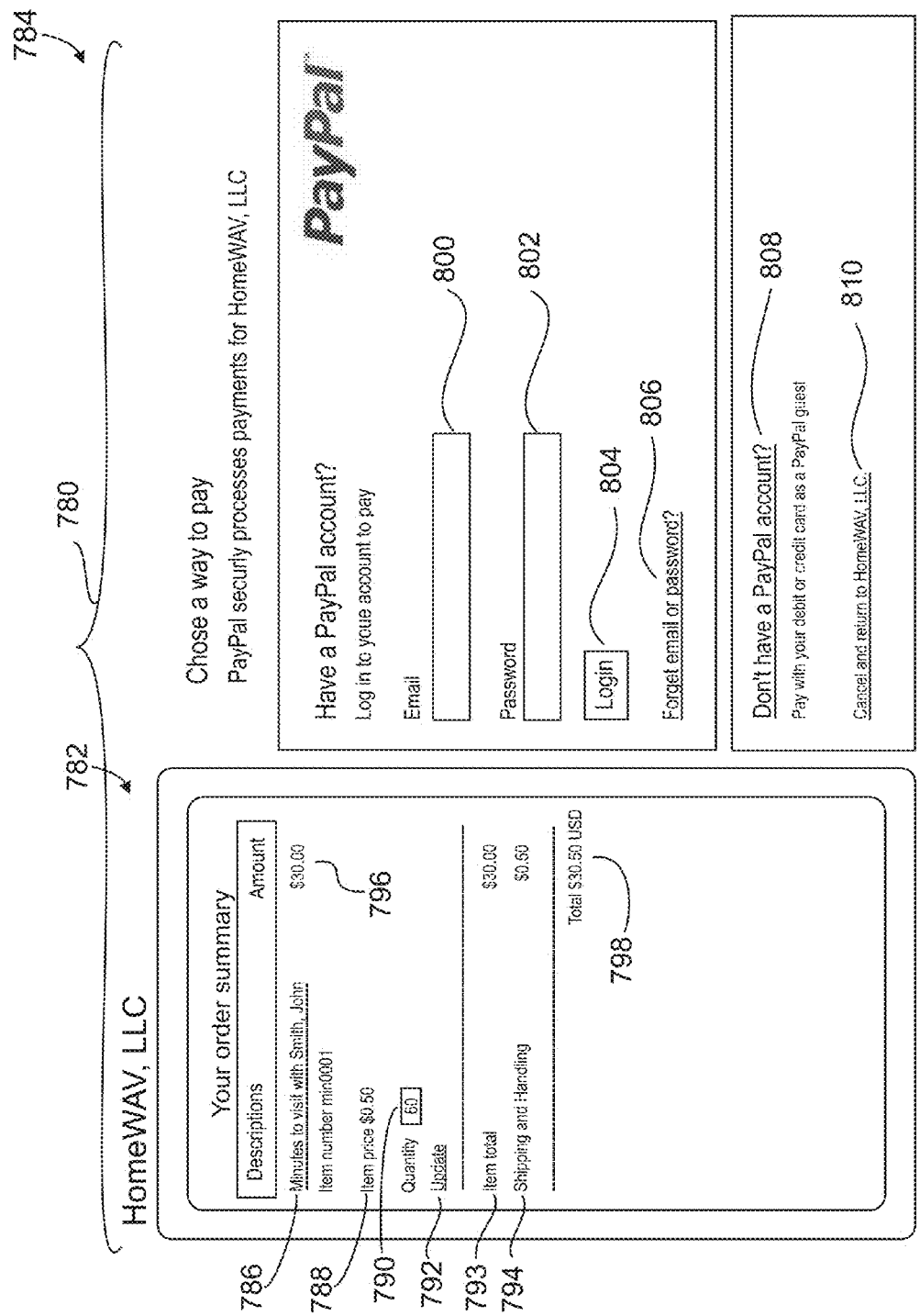

METHOD AND APPARATUS FOR PROVIDING BOTH AUDIO/VIDEO VISITATION AND VOIP TELEPHONIC VISITATION ORIGINATED EITHER BY AN INMATE OR BY AN OUTSIDE VISITOR DIRECTLY BETWEEN INMATES OF A PRISON AND AN OUTSIDE VISITOR WITHOUT NEED OF INTERVENTION BY PRISON PERSONNEL

RELATED APPLICATIONS

This application is a Continuation-in-Part of U.S. patent application Ser. No. 13/363,498 filed Feb. 1, 2012 entitled REMOTE WEB-BASED VISITATION SYSTEM FOR PRISONS, hereinafter the '498 application, that is included herein in its entirety by reference.

FIELD OF THE INVENTION

The invention pertains to remote video and/or VoIP telephonic visitation and, more particularly, to an Internet-based system, enabling outside originated video and/or VoIP telephonic visitation with incarcerated persons from a remote site, each incarcerated person typically possessing a personal electronic device for initiating and receiving communications to and from outside visitors.

BACKGROUND OF THE INVENTION

When two parties want to communicate over great distances in real-time, the telephone has heretofore been the communication technology of choice. However, advancements in communication technologies over the past several years now allow both audio and video communication between parties over great distances, typically via the Internet. These forms of communication are commonly referred to as video conferencing. Modern video conferencing, depending on the complexity (and associated expense) of the equipment involved can provide virtually real-time communication among two or more parties.

Video conferencing typically requires local equipment associated with each person seeking to participate in the conference. When the conference is to be started, the equipment at each location is used to call in (e.g., "conference in") to a call center or the like. As each of these endpoints establishes a connection with the central location, the video and audio signals may then be accessed by all of the participants so that a conversation with both audio and video can take place. One common type of video conferencing equipment uses especially dedicated equipment at each geographic location for the participants. Such equipment typically uses an Integrated Services Digital Network (ISDN) or similar data connection to transmit and receive audio/video communication data during the video conference.

Unfortunately, conventionally available video conferencing equipment of the prior art has a common characteristic: each system requires initiation and/or termination of the communication at the visitor's and/or at the inmate's end (i.e., end point control. Such end point control is problematic when the video conferencing system used is a remote Internet-based visitation system where one participant is incarcerated (i.e., a prisoner in a jail, prison, penitentiary, etc.).

As used hereinafter, the term inmate will be applied to such incarcerated persons and the term prison will be used to refer to any and all facilities where an inmate may be incarcerated.

To allow an inmate to have unrestricted Internet access in order to gain end point control of a video visitation system is universally disallowed. Prisons do not want inmates to have unrestricted access to the Internet. Consequently, in such Internet-based systems of the prior art, prison personnel are required to be involved in audio/video and telephonic visitation initiation and termination.

However, the advantages of an Internet-based video visitation system in the prison environment are many. Often, an inmate is incarcerated in a location a great distance from his family or friends. Such distances often result in visitation of the inmate being inconvenient or even impossible due to travel time and expense for friends and family. Consequently, an audio/video conference with the inmate provides an alternative to an in-person visit.

As noted, the expense and complexity of traditional video visitation equipment, and associated personnel cost incurred by the prison to facilitate end point control is significant. A critically important aspect of end point control within the prison is the need to make sure that the correct inmate is communicating with the correct visitor. This issue is addressed as "positive party identification". A prison's Internet-based VoIP and video visitation system must provide positive identification of the parties to the communication. By means of illustration, it could be disastrous if a convicted child molester inmate was erroneously made a party to an incoming video visit from a minor child attempting to visit with another inmate.

Likewise, while inmate originated telephone calls to outside visitors are well known in the prior art, no system is known to the inventor that allows direct, incoming phone calls to an inmate, that is to say, without the need for intervention by prison personnel. Rather, only direct outgoing phone calls, from the inmate to the visitor, may be made. In addition, to take part in a phone call the visitor has to wait for an inmate to have access to an inmate phone, and then wait for the inmate to call. Of course the call can only be completed if the visitor is available.

The prior art discloses systems whereby an outside visitor may call in to an inmate in a prison. In such systems, prison personnel must locate the inmate and cause the inmate to move to an available inmate phone equipped to receive incoming telephone calls. Prison personnel then need to transfer the call to that phone once the inmate is in position to receive the call. Prison personnel then still need to monitor the call.

None of the known prior art means of communications maximize the recognized beneficial result of keeping an inmate connected with his family and loved ones. The presently available prior art means of communications do not allow visitors to initiate VoIP telecommunications or video visits directly with the particular inmate, spontaneously, at the visitor's convenience.

While traditional video conferencing equipment may be used in the prison environment, the above-mentioned problems are present. To illustrate the point; a VoIP telecommunication or video communication initiated outside of the prison, over the Internet, directed to an inmate, using a traditional video visitation system must be received by one or more designated prison employees. The prison employee then has to contact prison employees working in the inmate's cell block, and determine whether the inmate is available to receive the visit. If the inmate is available to receive a visit at that time the prison employees, working in the inmate's cell block, are then required to coordinate ushering the inmate to the designated video visitation station to receive the visit, and the visit is connected. Outgoing Internet based video visitation using traditional systems also puts demands on prison personnel in that the system requires prison personnel to initiate the communication and coordinate placement of the correct inmate at the correct visitation station within his or her cell block to receive the communication in accordance with industry standard operating procedures for party identification.

Thus, a traditional video visitation system, using the Internet to facilitate the communication, whether the communication is incoming or outgoing, places a heavy labor burden on the prison, and allows a risk of human error in the positive party identification. Further, Internet-based traditional video visitation using prior art systems cannot be initiated directly by an inmate, without prison personnel intervention, because prisons will not allow unrestricted inmate access to the Internet.

In the copending '498 application, the applicant disclosed a system (i.e., the HomeWAV Video Visitation System) allowing inmate initiated video visitation with preregistered outside visitors that overcome known shortcomings of prior art video conferencing systems. That novel system requires no involvement by prison personnel to connect a video visit between the inmate and his visitor, and contains many security safeguards. For purposes of disclosure, a remote, web-based visitation system for prisons provided by HomeWAV, LLC, a limited liability company of the state of Virginia, located in Virginia Beach Va. is described. HomeWAV and HomeWAV Web Access Visitation are trademarks of HomeWAV, LLC.

The system disclosed in the '498 application utilizes prison-hardened terminals located throughout the prison and usable by one inmate at a time during allowable time periods. Such an arrangement does not lend itself to receiving either video visitation or VoIP telephonic communication originated by an outside visitor wishing to communicate with an inmate. Simply put, there is no positive identification established on the receiving end at the commencement of the communication. Rather, any inmate walking past the receiving terminal could pick up the receiver and engage in a video visitation.

Accordingly, what is needed is an Internet based video or telephonic visitation system that; (i) permits video or telephonic visits between inmates and visitors that are initiated either by inmates or by authorized outside visitors, under strictly controlled parameters, and (ii) utilizes individual electronic devices in the possession of inmates to directly initiate and receive Internet-based video or telephonic visitation.

DISCUSSION OF THE RELATED ART

Several attempts to solve some of the problems, that are solved by the present invention, may be found in the prior art. For example, U.S. Pat. No. 5,382,972 for VIDEO CONFERENCING SYSTEM FOR COURTROOM AND OTHER APPLICATIONS, issued Jan. 17, 1995 to Deno Kannes, teaches a conferencing system for interactive video (and preferably also audio) communication, which includes a composite video signal generation means. The system preferably also includes a recording unit for producing a permanent, combined video and audio record of a conference. The system includes a monitor for each conferee, which displays a composite video signal including a principal video image in a large picture region of the monitor screen and secondary video images in small picture regions of the monitor screen.

U.S. Pat. No. 6,844,893 for RESTAURANT VIDEO CONFERENCING SYSTEM AND METHOD, issued Jan. 18, 2005 to William G. Miller et al., provides a system and method that combines restaurant services with video-conferencing and multimedia access for diverse customer appeal. The MILLER et al. system and method employ a number of booths in a number of restaurants whereby each booth can video-conference with each other booth, particularly in different time zones, while also providing multi-media access such as satellite TV, cable, broadcast TV, computer programs and gaming, internet access. Each booth is linked to a local area network and is equipped with a display screen and video and audio controls. The local area network of each restaurant is linked to the local area network of each other restaurant forming a corporate intranet that allows media uses and various management capabilities such s scheduling, accounting, security, training and the like.

U.S. Pat. No. 7,046,779 for VIDEO CONFERENCE SYSTEM AND METHODS FOR USE AT MULTI-STATION SITES, issued May 16, 2006 to Thomas H. Hesse, provides a video conference system that includes at each of several sites multiple participant stations and a control station. A conference coordinator (e.g., a guard or receptionist) operating the control station receives notice from the control station that a scheduled conference is about to begin and directs a person identified to be a participant of the conference to a station designated by the notice. Signals from participant stations are monitored and if a participant station is determined to be unavailable, the conference may be rescheduled to replace the available station with an alternate available station. Notice sufficient to direct a participant to the alternate station is provided via the control station to the coordinator. The subject of detecting availability and rescheduling alternatives may be an item of equipment or an equipment capability (e.g., a recorder channel to be used for recording the conference). Higher ranking requests may force rescheduling of already scheduled lower ranking conferences.

U.S. Pat. No. 7,061,521 for VIDEO CONFERENCE SYSTEM PROVIDING PRIVATE AND ATTORNEY-CLIENT PRIVILEGED COMMUNICATIONS, issued Jun. 13, 2006 to Michael E. Bulriss et al., discloses a conference system that includes a first conference station generating at least one of audio and video signals from at least an attorney and a second conference station generating at least one of audio and video signals from the attorney's client, the attorney and the attorney's client having a relationship protected by the attorney-client privilege. The system also includes at least one communications link connecting the first and second conference stations that carries the audio and/or video signals between the first and second conference stations. A signal processor is disposed within the communications link between the first and second conference stations to route signals between the first and second conference stations. At least one control panel communicates with the signal processor and provides control over audio and/or video signals so that the attorney and the attorney's client are permitted to engage in a private communication without vitiating the attorney-client privilege.

U.S. Pat. No. 7,256,816 for SYSTEMS AND PROCESSES FOR SCHEDULING AND CONDUCTING AUDIO/VIDEO COMMUNICATIONS, issued Aug. 14, 2007 to John D. Profanchik et al., discloses methods of scheduling and conducting video visits, as well as computer architecture for providing such scheduling and conducting, where the participants in the visit are not required or able to interact with the audio/video equipment for the initial connection to start the video visit. In some embodiments, participants are also not able to interact with the equipment during the actual visit, and thus the equipment employed during the video visit may be isolated from physical contact by the participants. To initiate or terminate a video visit, a data center establishes a data connection with each participant, and thus the flow of data between the participants moves across a computer network via the data center. The visit may be monitored in virtually real-time by splitting the data transmitted between the participants and sending it to a monitoring terminal, rather than establishing a separate connection for the monitoring.

United States Published Patent Application No. 2009/0228383 for SYSTEM AND METHOD FOR PROACTIVELY ESTABLISHING A THIRD-PARTY PAYMENT ACCOUNT FOR SERVICES RENDERED TO A RESIDENT OF A CONTROLLED-ENVIRONMENT FACILITY, published Sep. 10, 2009 upon application by Veronica Martinez et al., provides systems and methods for proactively establishing a third party payment account for services rendered to a resident of a controlled-environment facility ("CEF"). A campaign-triggering event is detected, which triggers contact of prospective third-party ("$3^{rd}$ party") payers for a resident of a CEF in order to encourage such prospective $3^{rd}$ party payers to establish $3^{rd}$-party payment accounts for the resident. In this manner, the prospective third party payers are proactively contacted prior to an expected future demand for service by the resident. A method thus comprises identifying at least one prospective third-party payer for a resident of a controlled-environment facility, and proactively contacting the identified at least one prospective third-party payer prior to demand for service by the resident to encourage the identified at least one prospective third-party payer to establish a third-party payment account for payment for future service expected for the resident.

U.S. Pat. No. 4,054,756 for METHOD AND APPARATUS FOR SPECIAL SERVICE CALL HANDLING, issued Oct. 18, 1977 to William Kirk Comella et al., discloses a for serving special service calls such as collect, person-to-person and charge-to-third number on a wholly automatic basis without any operator intervention normally being required. The system requests specific information from the calling party such as, his or her name for collect calls, and utilizes the received answers in the formulation of additional announcements to the "called" subscriber. The system is responsive to information received from the called station or third party station for instituting billing for the requested call after a connection is established between the calling and called stations.

U.S. Pat. No. 7,158,621 for PRE-PAID CALLING AND VOICE MESSAGING SERVICE FOR INMATES, issued Jan. 2, 2007 to Anthony J. Bayne, discloses a system wherein inmates place free incoming calls to a call processing system and are prompted to choose between accessing a voice mail system and calling an outside party. If an outside party is to be called, an inmate provides a phone number and an outgoing call is placed to the outside party. If the outside party provides payment for the call, the inmate is connected to the outgoing call and the incoming call is terminated. If the outgoing call is not accepted, the inmate may record a voice message for the outside party in a voice mailbox assigned to the inmate. For an access fee, the outside party may access the voice mailbox assigned to the inmate. Advertising messages may be presented to inmates during incoming calls and/or to outside parties during outgoing calls. Advertising revenue may cover incoming call charges. Inmates and/or outside parties may record voice messages for advertisers U.S. Pat. No. 8,064,580 for TELEPHONY SYSTEM AND METHOD WITH IMPROVED FRAUD CONTROL, issued Nov. 22, 2011 to Wesley Larry Apple et al., teaches an inmate communications system providing a feature-rich platform with a high degree of flexibility and security employing call control facilities located off institutional premises. Authentication processes for calling and called party verification include biometric techniques in some embodiments. Distributed processing of call control and billing provide flexible interactive call payment processes. Preferred embodiments feature voice over IP transmission and control featuring controlled access to avoid addition of unauthorized third-party call participants. Monitoring, recording and selective forwarding of calls is provided under control of system administrators.

U.S. Pat. No. 8,160,219 for CONTROLLED THREE-WAY CALLING, issued Apr. 17, 2012 to Anthony Jeremiah Bayne, provides a system wherein an inmate calls a call processing system and provides two phone numbers to it. The first phone number is for a 2nd Party who will accept the inmate's collect call and who will agree to pay any additional charge for adding a third party to the collect call. The second phone number is for a 3rd Party the inmate would like added to the collect call. The call processing system places the inmate on hold while the system dials the 2nd Party. When the 2nd Party accepts the inmate's collect call and agrees to pay for an additional fee for establishing a three-way call during the collect call, the inmate is taken off hold and is connected to the 2nd Party.

None of the patents and the published patent application, taken singly, or in any combination, are seen to teach or suggest the novel Method and Apparatus for Providing Both Audio/Video Visitation and VoIP Telephonic Visitation Originated Either by an Inmate or by an Outside Visitor Directly Between an Inmate of a Prison and an Outside Visitor Without Need of Intervention by Prison Personnel of the present invention.

SUMMARY OF THE INVENTION

The present invention provides a VoIP telecommunication and video visitation system and method adapted for use in providing both inmate and outside visitor originated remote, Internet-based visitation with inmates incarcerated in a prison. The need for prison personnel to provide endpoint control to schedule, initiate, or terminate a visit is eliminated in the novel visitation system of the invention. Further, all visitations are initiated or received by the inmates during defined visitation times established by the prison. Also importantly, while this is a fee for services system, with a programmable per minute charge, no monies pass through the prison, but rather are paid directly to the owner/operator of the remote visitation system.

The "jail-hardened" terminals disclosed in the '498 application may be replaced by individual electronic devices possessed by inmates and purchased, leased, or rented from the prison or the owner/operator of the remote visitation system. All inmate visits are originated from, or received by, these individual electronic devices. Each inmate-possessed electronic device communicates only with a security gateway under control of the prison.

Unless a visitor has been designated a clergy member or a legal representative with whom the inmate is entitled to privileged communication, all visits whether video or telephonic are recorded. Visits with privileged visitors are not typically recorded.

Visitors need an Internet-connected appliance which may be a desktop or notebook computer, an Internet connected tablet, a smart phone, or any other suitable device capable of supporting video conferencing and Voice Over Internet Protocol (VoIP) telecommunications across the Internet.

Visitors using PayPal® or a similar on-line payment system prepay for visitation minutes with an individual inmate. A per-minute charge may be set for each call made. As used herein the term "call" is used to refer to either a video visitation or a VoIP telecommunication. There is typically no minimum call length.

Time is tracked for each call. The call duration and the minutes remaining for a call based upon the maximum allowed call length and an inmate's available minutes are displayed for both the visitor and the inmate.

During a video visit, video images of both the inmate and the visitor are displayed on both the inmate's device and the visitor's station. No video images are provided during a VoIP telecommunication.

It is, therefore, an object of the invention to provide an Internet-based audio/video visitation system for prisons that allows video conferencing and/or VoIP telecommunication between an inmate, in a prison, and an outside visitor across the Internet.

It is another object of the invention to provide an Internet-based audio/video visitation system for prisons wherein an individual electronic device in possession of an individual inmate is used to originate or receive a video visit or a VoIP telecommunication.

It is an additional object of the invention to provide an Internet-based audio/video and/or VoIP telecommunication visitation system for prisons wherein either an inmate or a preregistered outside visitor may initiate the video visit or VoIP telecommunication.

It is a further object of the invention to provide an Internet-based audio/video and VoIP telecommunication visitation system for prisons wherein each individual electronic device is constrained (i.e., physically modified, programmed or otherwise constrained) so as to only allow secure communication between the device and a prison installed portion of the prison visitation system.

It is a still further object of the invention to provide an Internet-based audio/video and VoIP telecommunication visitation system for prisons wherein no endpoint control is required by prison personnel.

It is yet another object of the invention to provide an Internet-based audio/video and VoIP telecommunication visitation system for prisons wherein no monies flow through or are processed by the prison.

It is another object of the invention to provide an Internet-based video and VoIP telecommunication visitation system for prisons wherein a prison administrator may block calls to or from either selected individual inmates or all inmates in the prison, as well as block calls to or from designated visitors, or all visitors.

It is an additional object of the invention to provide an Internet-based video and VoIP telecommunication visitation system for prisons wherein a percentage of the per-minute charge for calls may be paid to the prison.

It is a still further object of the invention to provide an Internet-based audio/video and VoIP telecommunication visitation system for prisons at no cost to the prisons.

It is another object of the invention to provide positive party identification without the need of prison personnel involvement.

It is still another object of the invention to provide an Internet-based video visitation system for prisons displaying real-time visual images of the inmate and visitor on the screen of an individual electronic device in possession of an inmate.

It is yet another object of the invention to provide an Internet-based VOIP telecommunication and video visitation system for prisons that allows prison personnel real-time monitoring and recording of VOIP telecommunications and video visits.

It is a further object of the invention to provide an Internet-based VOIP telecommunication and video visitation system for prisons wherein individual electronic devices may be purchased and/or leased from either the prison or the operator of the prison visitation system.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIGS. 4e through 4g are screen shots of a visitor's record and send a message process;

FIG. 4n is a screen shot of the add minutes process.

DETAILED DESCRIPTION OF THE PREFERRED EMBODIMENT

The present invention provides a system for providing video and/or telephonic visitation between inmates incarcerated in a prison, and visitors located remotely from the prison. Visitors each have an authorized, Internet connected computer or other Internet appliance including Voice Over Internet Protocol (VoIP) capability. Visitation may be initiated by either the inmate or the remote visitor.

As used herein the term VoIP refers to a specific method of packaging voice signals for transmission over an Internet connection. However, the applicant believes that other methods, protocols, etc. for packaging voice signals for Internet transmission may exist or may emerge in the future. Consequently, as used herein the term VoIP is intended to include any and all existing or emerging voice transmission methods or protocols in addition to the specific method chosen for purposes of disclosure (i.e., VoIP).

Figure 1B:
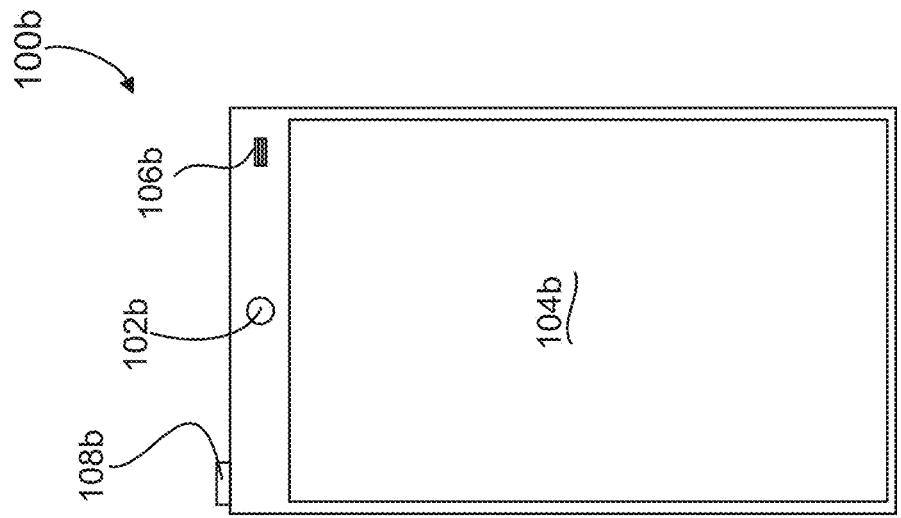
FIGS. 1a and 1b are top plan schematic views of a representative tablet style and representative smart phone style electronic device, respectively, in accordance with the invention.
Figure 1A:
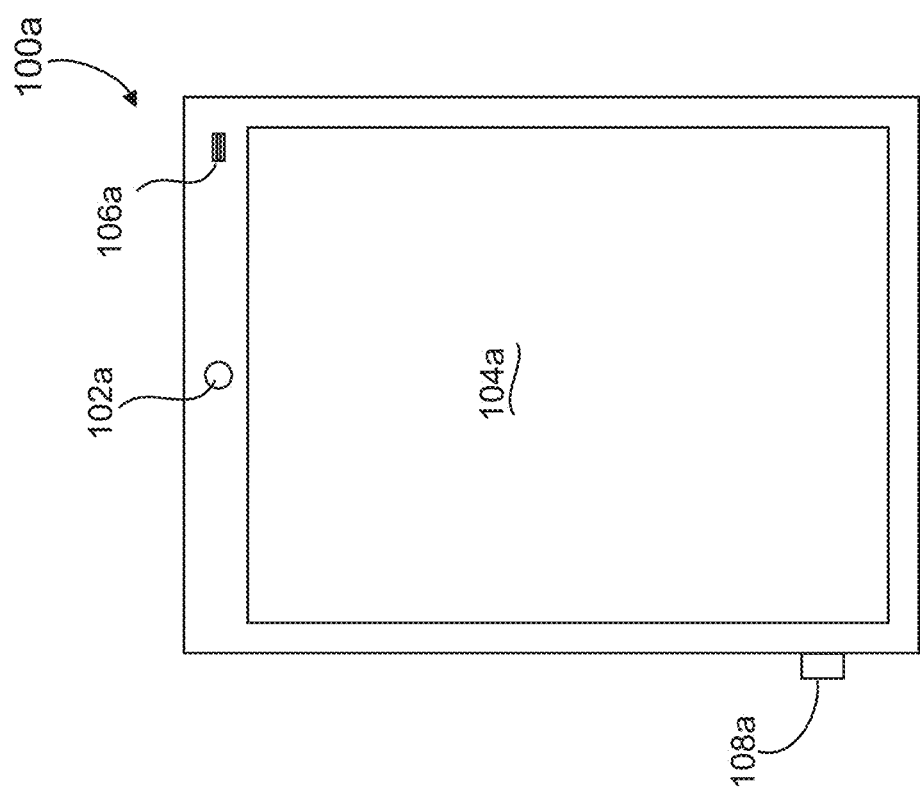

Referring first to FIGS. 1a and 1b there are shown top plan schematic views of two possible form factors for a device in accordance with the present invention. FIG. 1a shows a device 100a in the form factor of a so-called tablet computer while FIG. 1b shows a device in the form factor of a so-called "smart" phone. It will be recognized that devices may be provided in a wide range of form factors and, consequently, the invention is not considered limited to the form factors chosen for purposes of disclosure.

Each device 100a, 100b has four fundamental elements depicted. Each device 100a, 100b has a forward-facing camera 102a, 102b; a screen 104a, 104b; a built-in microphone shown schematically at reference numbers 106a, 106b, respectively; and a headphone jack 108a, 108b, respectively.

Each device 100a, 100b has a wireless communications interface. For purposes of disclosure, a so-called "Wi-Fi" interface has been chosen as a communications interface. It will be recognized by those of skill in the art that other wireless interfaces currently exist and that the pace of development in wireless digital communication is rapid. Consequently, the invention is not considered limited to a particular wireless communications interface. Rather, the invention is intended to include any suitable wireless interface whether known or yet to be developed in addition to the Wi-Fi interface chosen for purposes of disclosure.

Each device 100a, 100b has a unique identifier that may be transmitted by the wireless interface to identify a particular device 100a, 100b. Such unique identifiers include but are not limited to a Media Access Control address ("MAC" address) or the like. MAC addresses are most often assigned by the manufacturer of the wireless interface included within a device 100a, 100b and are typically stored in the device's hardware, not specifically identified, for example, in read-only memory, or some other firmware mechanism. Such MAC addresses are referred to as burned-in addresses.

It will be recognized that exemplary devices 100a, 100b contain electronic support circuitry and a power supply (e.g., a rechargeable battery). Such devices 100a, 100b are considered to be well known and may be purchased as off-the-shelf devices. Optionally, such devices 100a, 100b may be custom built for the application and may contain security features, not specifically identified, designed to allow more secure operation in a correctional facility environment.

In a prison, any communication apparatus for use by inmates has heretofore been an apparatus constructed using "prison hardened" techniques and materials. Inmates have used such apparatus for all communications with the outside world.

The present invention supplements or replaces such apparatus with the devices 100a, 100b individually "owned" (i.e., purchased, rented, or leased) by individual inmates from the prison or from the system operator of the prison visitation system. The HomeWAV Web Access Visitation for Correctional Facilities by HomeWAV, LLC of Virginia Beach, Va. USA, hereinafter the HomeWAV system or simply the system, is assumed to be the system operator for purposes of disclosure.

Figure 2:
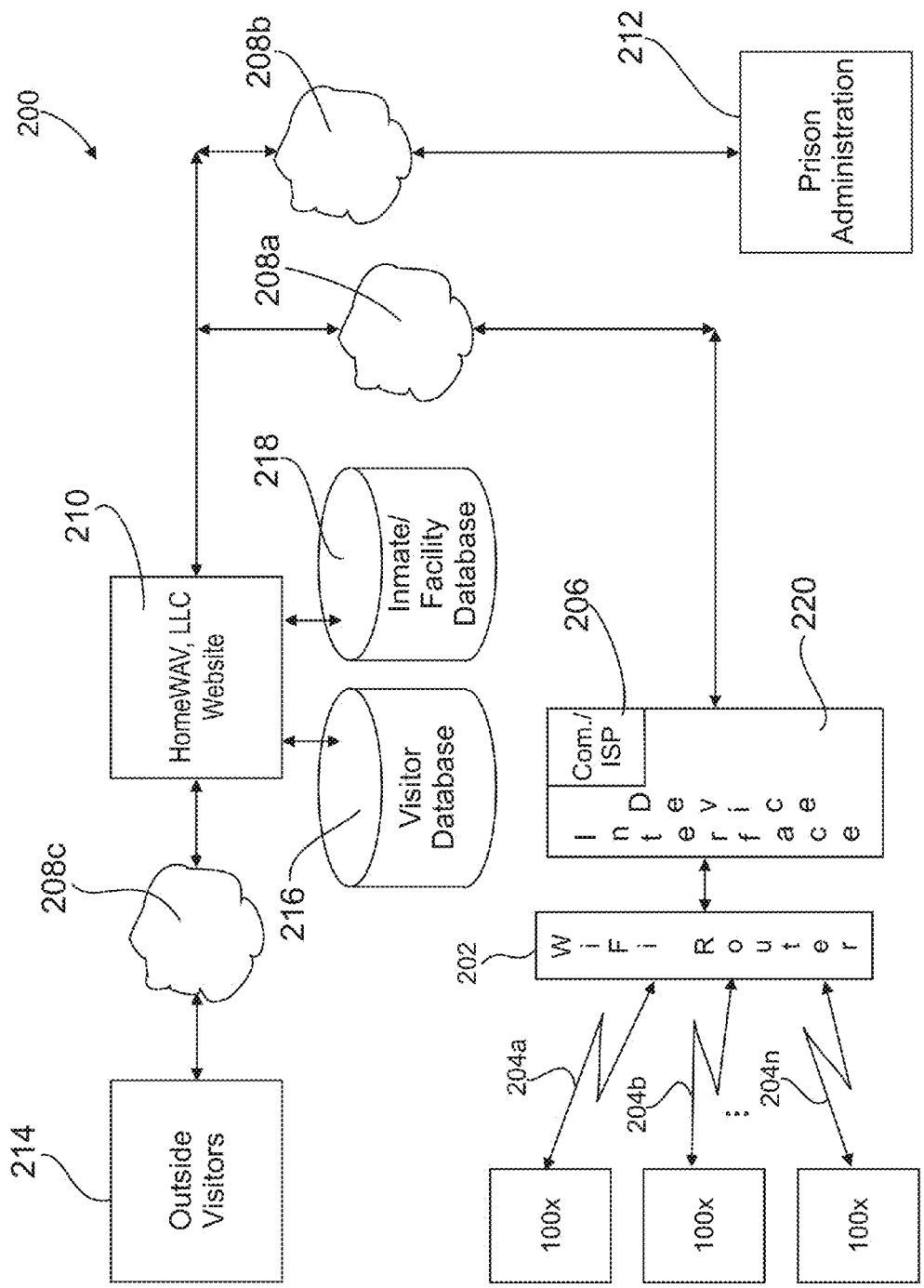
FIG. 2 is a simplified system block diagram of a portion a security system supporting the electronic devices of FIG. 1 in accordance with the invention.

Referring now to FIG. 2, there is shown a greatly simplified block diagram of the novel HomeWAV, LLC prison visitation system in accordance with the invention, generally at reference number 200. Hereinafter, for purposes of brevity, the HomeWAV prison visitation system is referred to as "the HomeWAV system". The HomeWAV system 200 provides "gate keeping" security functions that assure only valid, authorized devices 100a, 100b are allowed to communicate with the HomeWAV system 200. Further, the HomeWAV system 200 ensures that inmates may communicate only with authorized visitors as approved and controlled by the prison.

As used herein, reference number 100x is used to generically refer to any and all devices for example, devices 100a, 100b.

Using the devices 100x with the system 200 and methods of the present invention, inmates may communicate only with the HomeWAV system. Each device 100x is pre-programmed such that it can only access the HomeWAV system. As used herein, the term pre-programmed refers to either software or hardware modifications or add-ons that limit an off-the-shelf device to exclusive communication with the HomeWAV system. Prisoners are allowed access to only those applications and programs on the HomeWAV system that have been approved by the prison. Specifically, device 100x is pre-programmed to prevent uncontrolled access to the Internet.

More specifically, each device 100x may be pre-programmed so that it will only link with a particular wireless 202 router located within the prison. It is especially important to note that no two devices 100x are allowed to communicate directly with one another, and each device will only be allowed to communicate with visitors who have been approved to visit with the inmate to whom the particular device has been assigned.

Communication capabilities usually associated with an off-the-shelf electronic appliance such as cell phones, smart phones, or tablet computers, etc. may be modified. In device 100x, any existing cellular network communications or open wireless network communication (i.e., Wi-Fi) is typically disabled.

HomeWAV system 200 incorporates security features that make it practical for an individual inmate to posses his or her own device 100x. For example, each device 100x may require biometric input from a particular inmate for the device to be activated. In most embodiments, a unique prisoner-generated personal identification number (PIN) may be required for device 100x activation. Further, HomeWAV system 200 limits each device 100x to communicating with the IP addresses of a particular inmate's approved visitors' equipment as controlled by the HomeWAV, LLC website 210 via portion 208a of the "cloud". It will be recognized that while three "cloud portions" 208a, 208b, 208c are shown on FIG. 2, that representation is done for clarity in depicting the flow of information in the HomeWAV prison visitation system. There is, of course, only a single "cloud" representing the entire Internet.

Three devices 100x, representative of any number of such devices 100x found in a prison, are shown communicating with a wireless router 202 via communications paths 204a, 204*b* . . . 204*n* using a built-in Wi-Fi communications interface, not specifically identified, within devices 100*x*.

Router 202 may have an integrated server, for example, an Interface Device shown schematically at reference number 220, or it may be connected, along with other routers, not shown, with a server, not shown, located elsewhere in the prison. The prison's routers, servers, and associated connections, none of which are shown, constitute the prison's local area network (LAN), not specifically identified. The prison's LAN is, in turn connected to the wide area network (WAN) outside of the prison via a communications portion 206 that may include the prison's Internet Service Provider (ISP), not specifically identified. The prison's LAN is thereby connected to the Internet, shown schematically as cloud portion 208*a*.

A prison administration workstation, not shown, but described in detail in the '498 copending application is connected to the HomeWAV website 210 via another Internet connection shown schematically as portion 208*b* of the cloud.

Outside visitors communicate with the HomeWAV website 210, via the Internet, shown schematically as cloud portion 208*c*.

The HomeWAV website 210 maintains and accesses databases of visitors 216 and of inmates and prisons 218. Using information from databases, the HomeWAV visitation system 200 acts as a gate keeper whereby only registered visitors are connected to registered inmates with whom that visitor is specifically authorized to visit.

Based on input from Prison Administration 212 all or selective portions of an inmate's communication may be disabled. Single, identified groups (e.g., a cell block, etc.), or all devices 100*x* may be disabled by prison administration 214. In addition to complete disabling of devices 100*x*, hours of operation may be imposed on a device by device basis at the discretion of prison administration 214. Additional control may be exercised by prison administration 212 as also described in detail in the copending '498 application.

The HomeWAV system 200 of FIG. 2 relates only to prison visitation system using devices 100*x* in possession of individual inmates. In the co-pending '498 application, there is disclosed a system for video visitation that allows inmates to initiate video visitation calls from secure terminals within the prison during allowed hours to pre-approved outside visitors equipped with an Internet enabled computer or other similar appliance. These prisoner-initiated video visitations do not rely on prison personnel to either establish, schedule, or monitor these visitations. All visits, unless excepted by attorney-client or clergy privilege, are recorded for security purposes. The system of the '498 application, however, has no provision for video or telephone visitation originated by an approved outside visitor to an inmate.

The HomeWAV system 200 of FIG. 2 is assumed to have all necessary security enhancements to allow outside visitor originated video or telephonic visitation. Such system enhancements are discussed in detail hereinbelow.

The novel concept of letting inmates have individual communications devices under their own control opens numerous possibilities for enhanced visitation via VoIP telephone and/or video visitation.

Figure 3A:
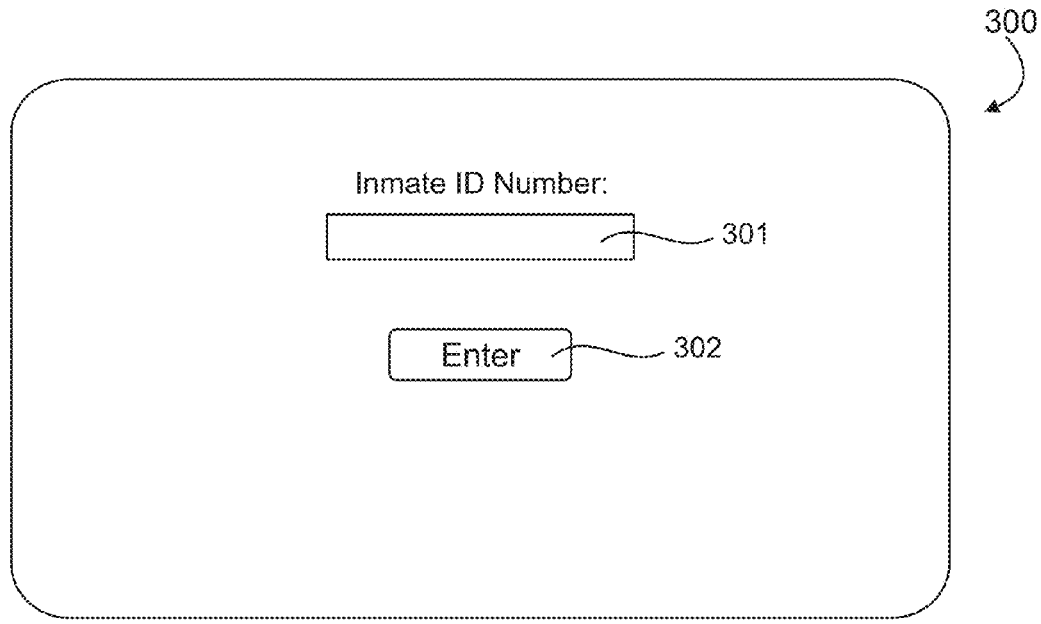
FIG. 3a is a screen shot of the screen the inmate views when his/her device wakes up.
Figure 3B:
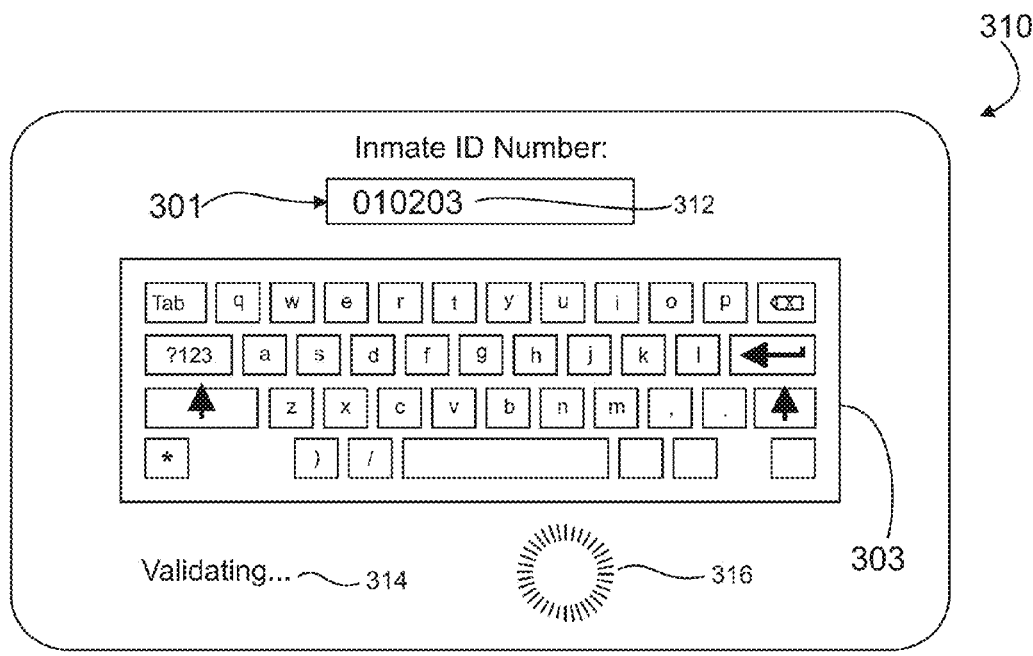
FIG. 3b is a screen shot of an inmate's sign in screen.
Figure 3C:
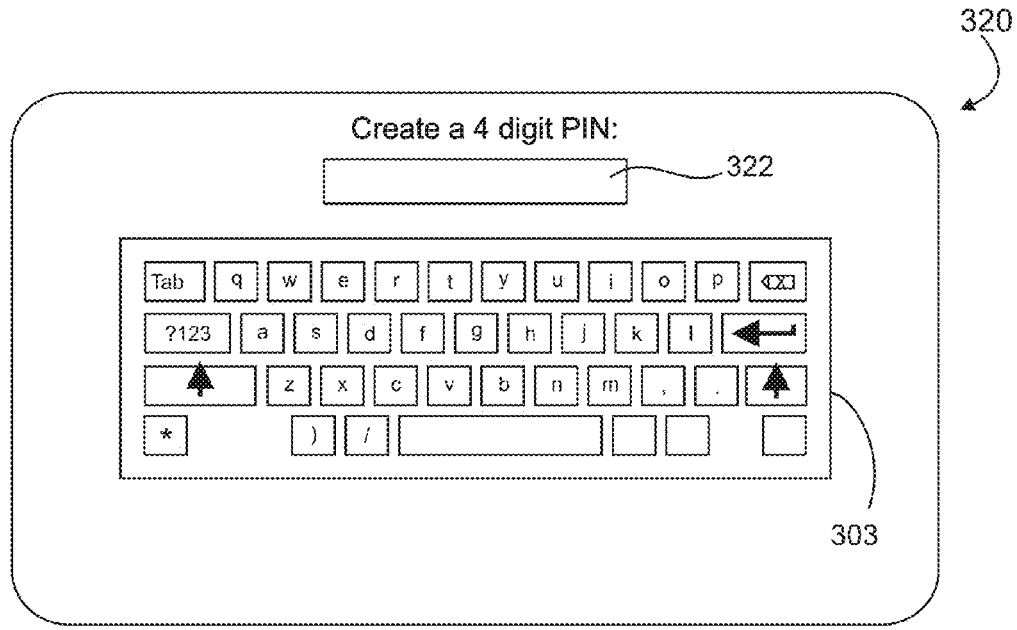
FIGS. 3c and 3d are screen shots of an inmate's create a new PIN process.
Figure 3D:
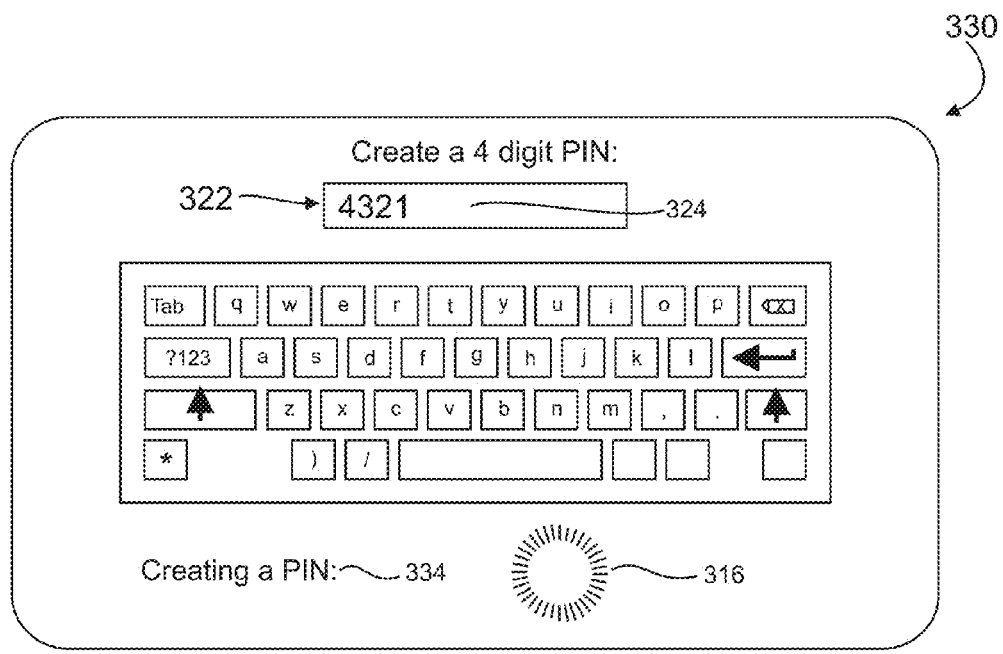
Figure 3E:
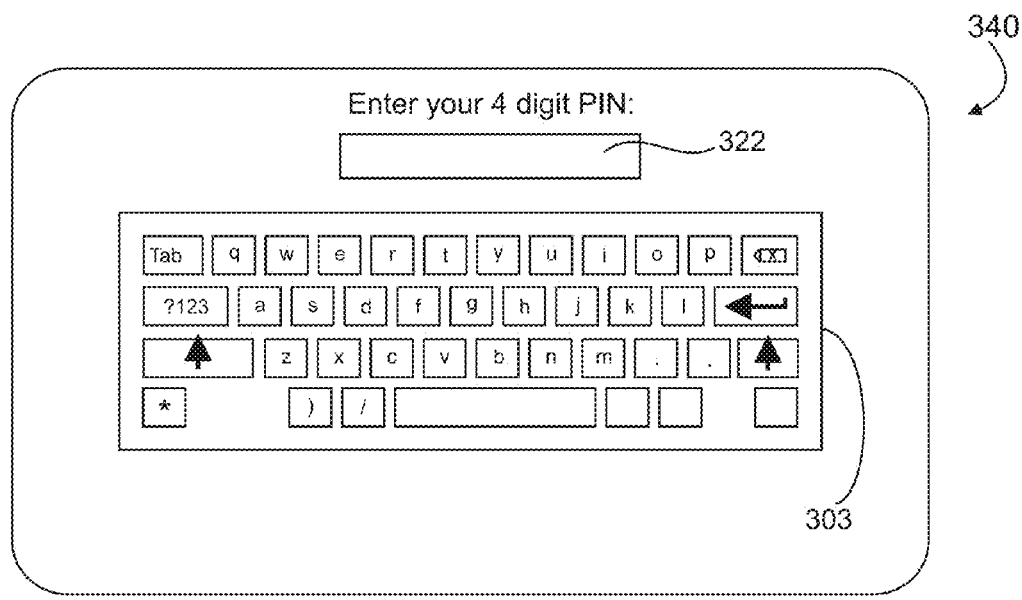
FIGS. 3e and 3f are screen shots of an inmate's existing PIN entry and validation process.
Figure 3F:
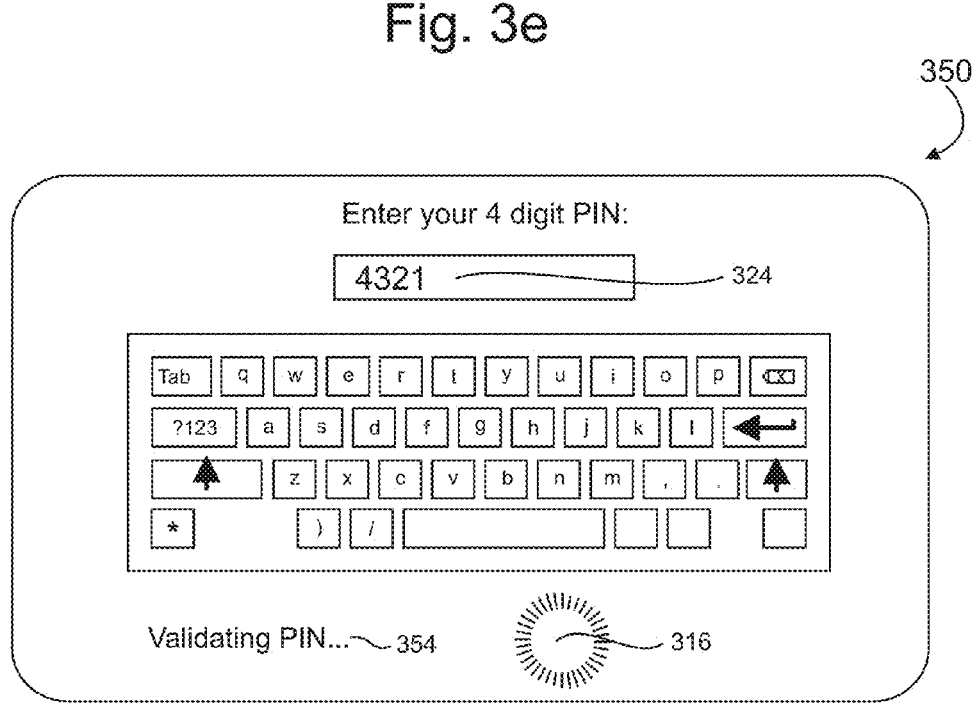
Figure 3G:
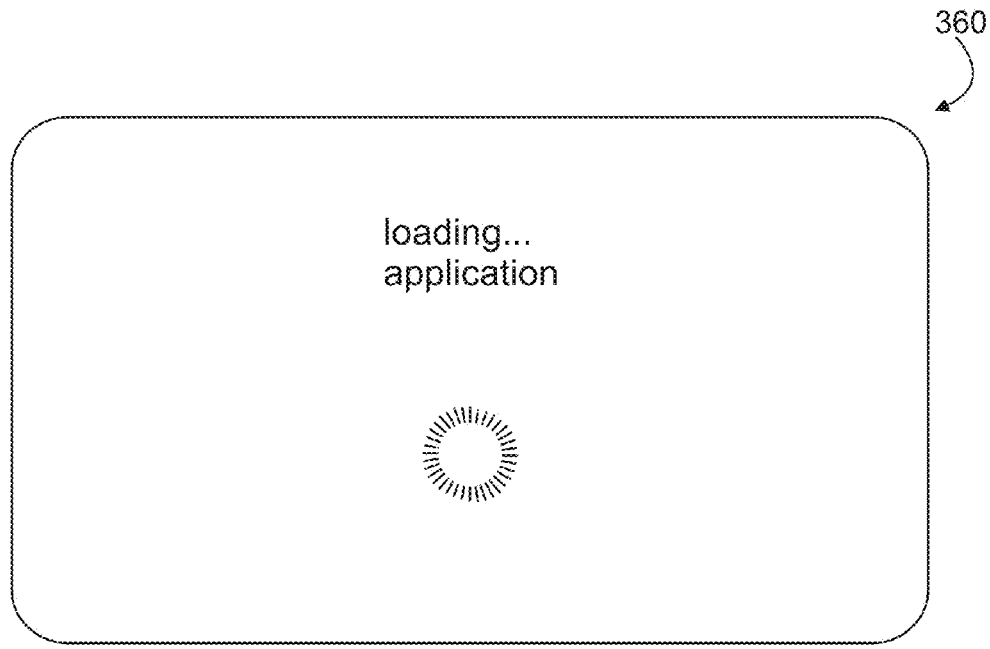
FIG. 3g is a screen shot of an application loading status screen.
Figure 3H:
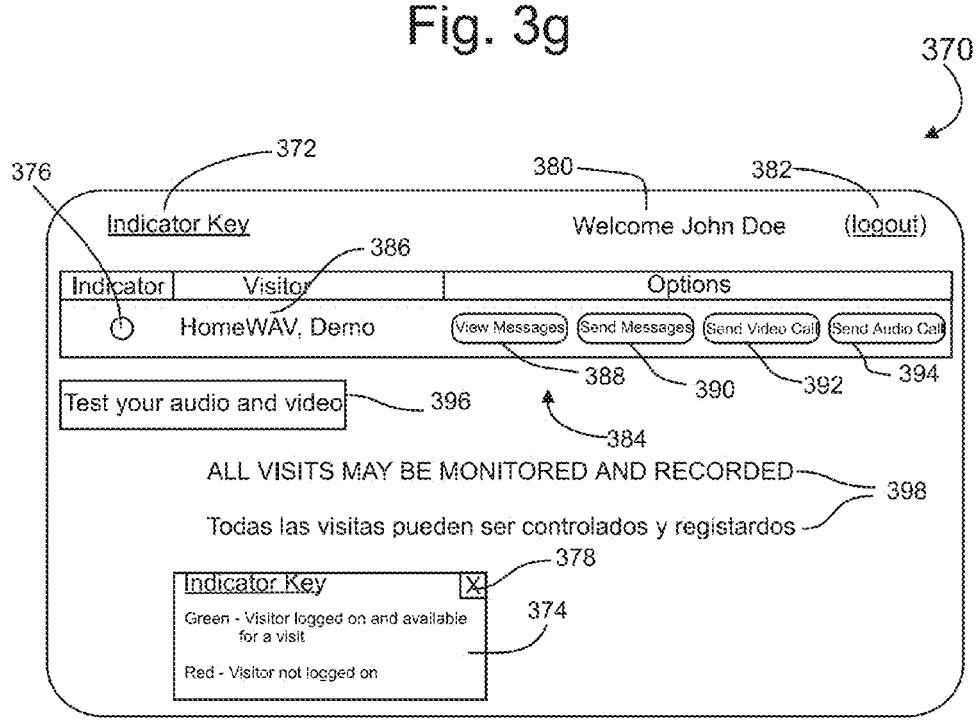
FIG. 3h is a screen shot of an inmate's home screen.
Figure 3I:
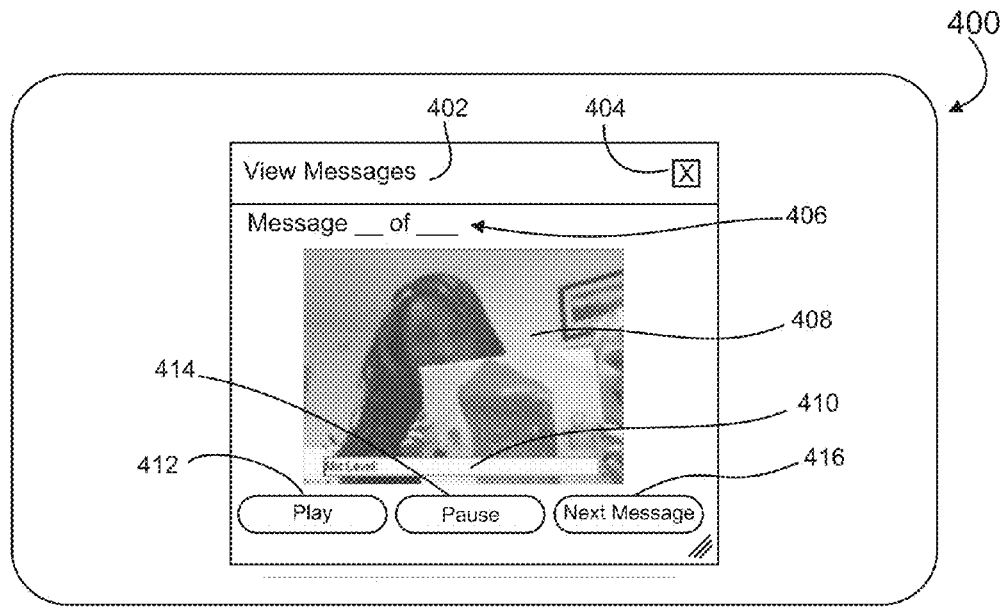
FIG. 3i is a screen shot of a view and play messages process.
Figure 3J:
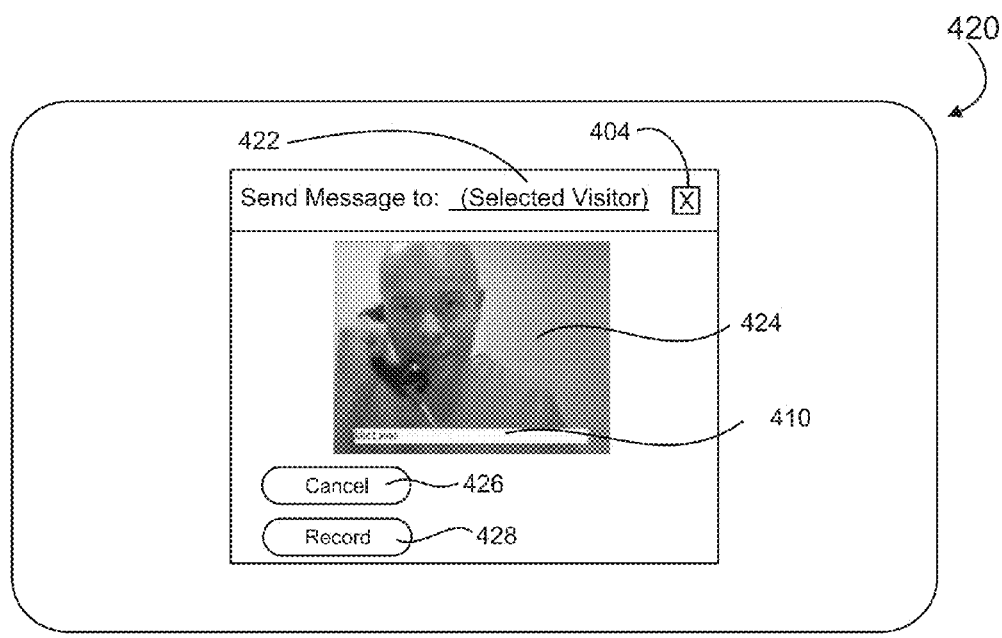
FIG. 3j is a screen shot of a send message process.
Figure 3K:
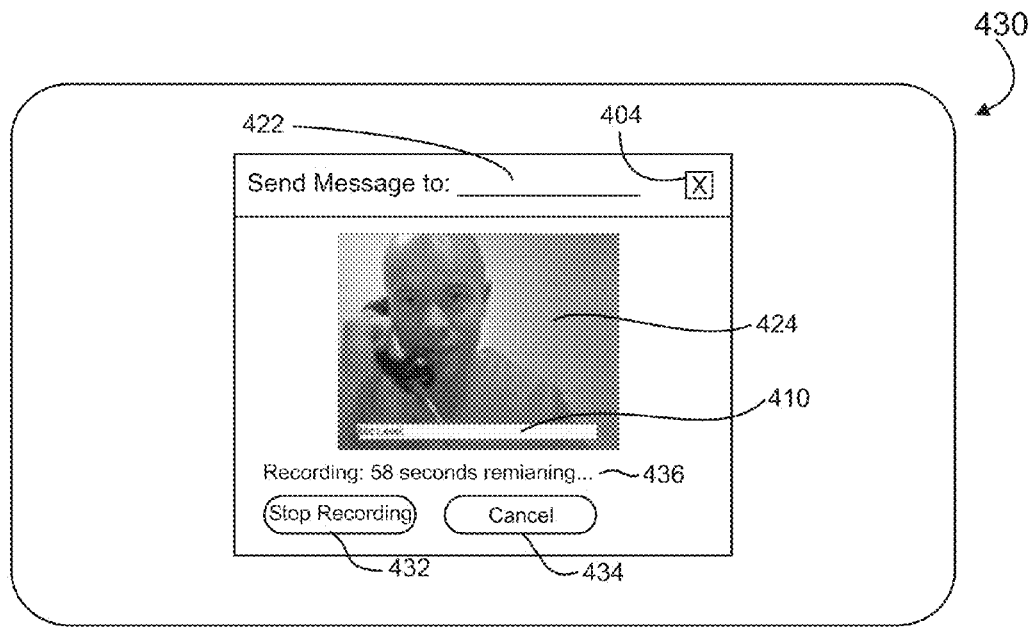
FIGS. 3k and 3l are screen shots of the record a message process.
Figure 3L:
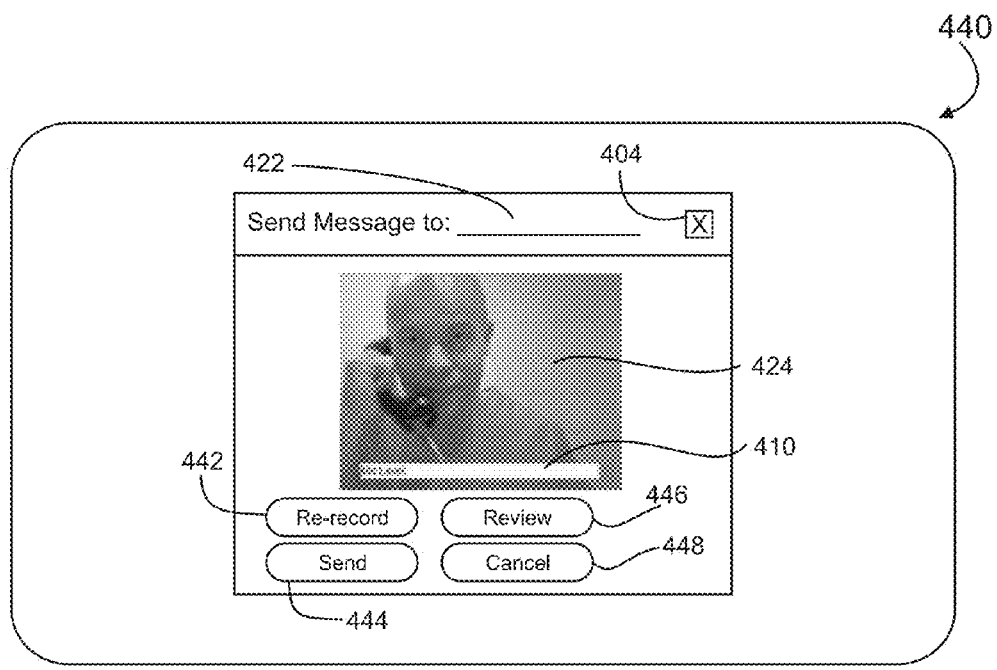
Figure 3M:
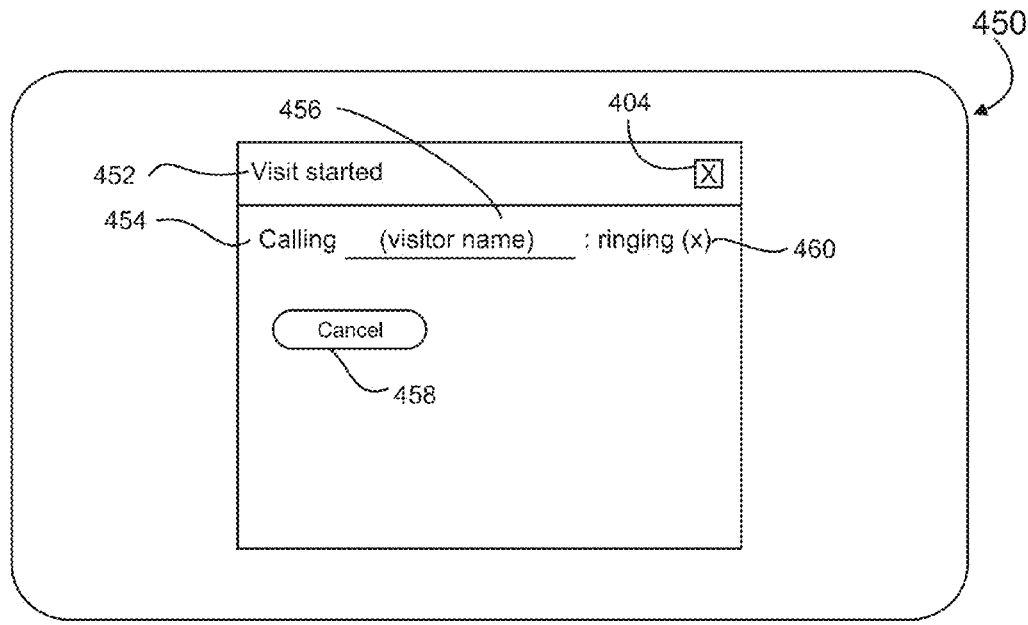
FIG. 3m is a screen shot of the initiate a video visitation process.
Figure 3N:
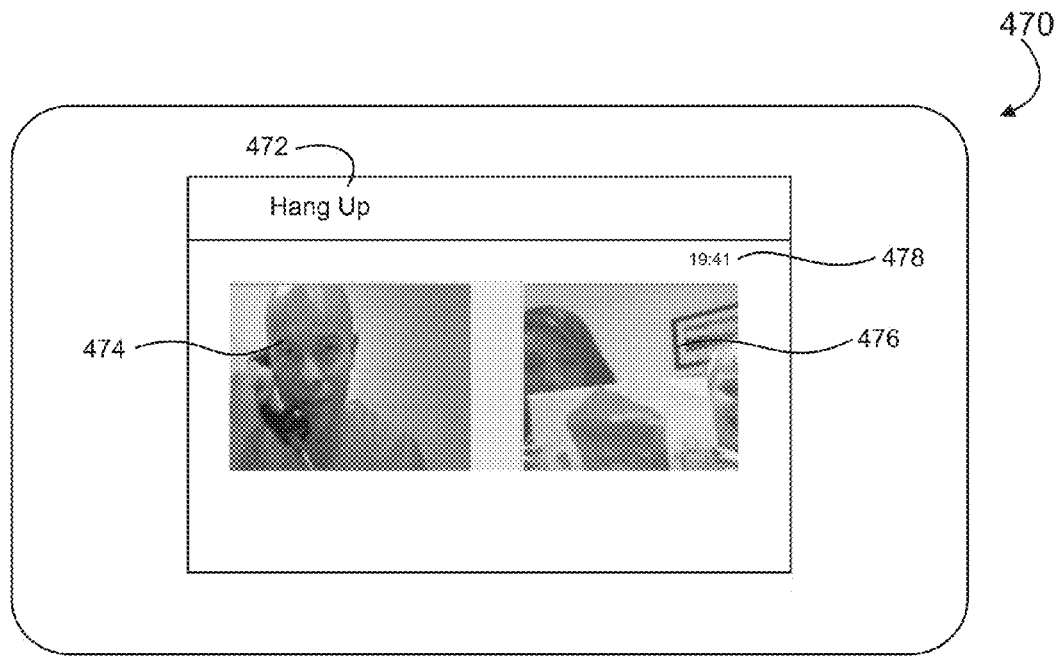
FIG. 3n is a screen shot of a video visitation in process.
Figure 3O:
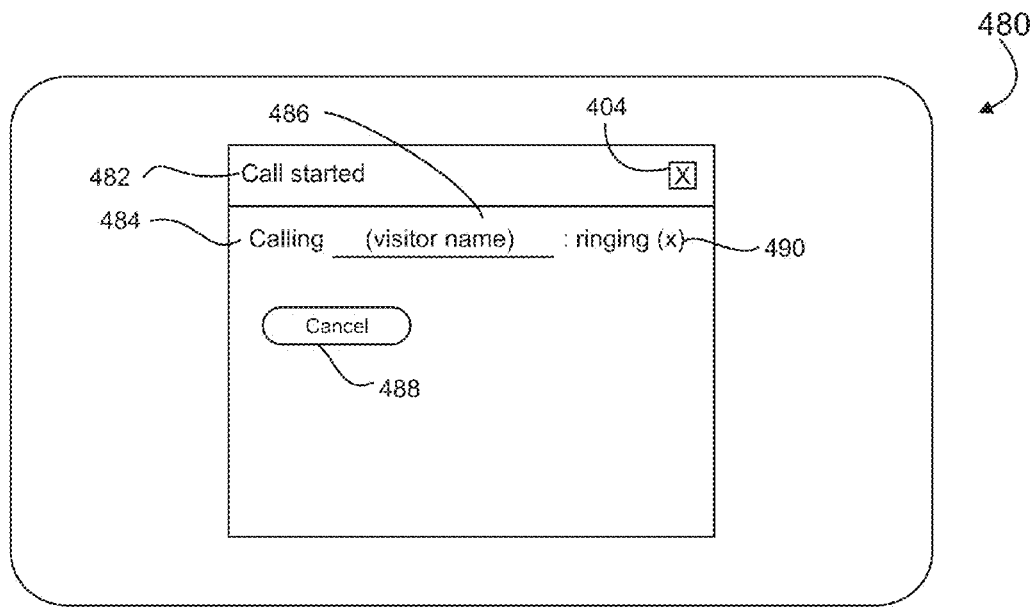
FIG. 3o is a screen shot of the initiate a VoIP telecommunication process.
Figure 3P:
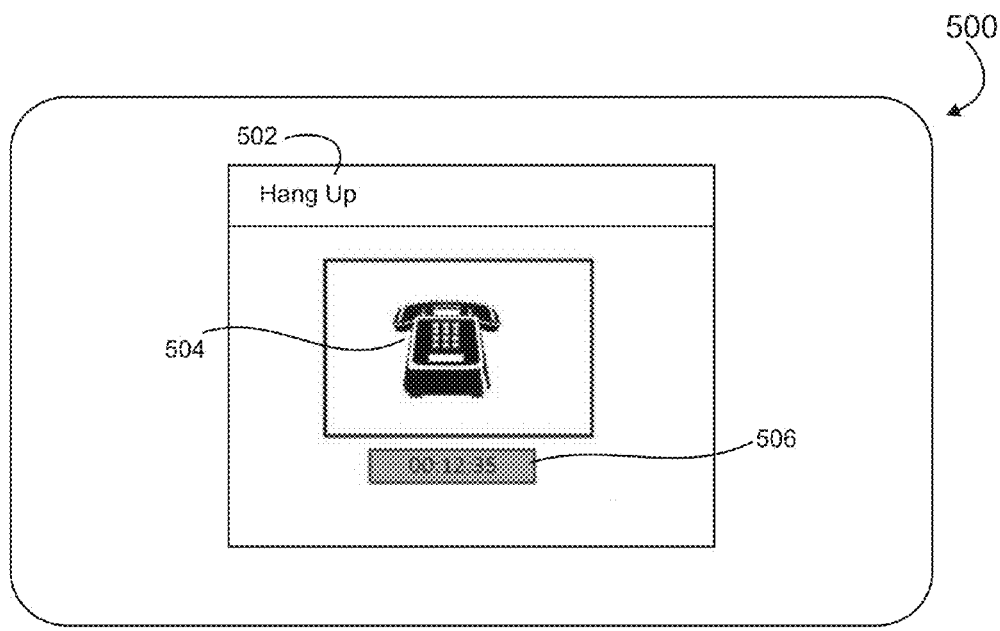
FIG. 3p is a screen shot of the VoIP telecommunication in process.

Refer now also to FIGS. 3*a*-3*p*.

FIG. 3*a*, shows a "wakeup" screen shot 300 of device 100*x* that is displayed when device 100*x* is turned on, and assuming that device 100*x* is a touch screen device and the screen is touched. A field 301 shows where the inmate may enter his or her Inmate ID No. An "Enter" button 302 is also shown.

FIG. 3*b* shows a screen 310 that appears after "wakeup" screen 300 and displays a touch screen keyboard 303 and field 301 into which an inmate has typed his or her Inmate ID Number, 312.

Once the inmate has entered his or her ID Number 312, a status message 314 that indicates that the information is being validated is displayed. In addition, a rotating icon 316 indicates that the device 100*x* is processing the information. The entered Inmate ID Number 312 is checked against a list of authorized inmate numbers possibly stored in device identification database 208. In addition, the MAC Address or similar unique ID of the device 100*x* is checked against a list of authorized devices 100*x*. In some cases, the MAC Address is checked against the Inmate ID Number 312 to ensure that the correct inmate is using the device 100*x*.

Assuming that the MAC address etc. is valid and the inmate has entered a valid Inmate ID Number 312, one of two screens will be displayed to the inmate.

If this is the first time signing into the HomeWAV system from device 100*x*, a new screen 320 (FIG. 3*c*) is displayed. On screen 320, the inmate is instructed to Create a 4 Digit PIN in a field 322. After the inmate enters a 4 digit PIN 324, the system informs the inmate that the PIN 324 is being created (screen 330, FIG. 3*d*).

If, however, it is not the first time the inmate has logged into the HomeWAV system from device 100*x*, then screens 320 and 330 (FIGS. 3*c* and 3*d*) are not displayed. Instead, screen 340 (FIG. 3*e*) is displayed and the inmate is instructed to enter his or her PIN 324 in window 322 using virtual keyboard 303.

Once the PIN 324 is entered, screen 350 (FIG. 3*f*) is displayed and a status message 354 indicates that the PIN 324 is being validated. Again, rotating icon 316 indicates that the device 100*x* is processing the information.

Once the PIN 324 is validated, a new screen 360 (FIG. 3*g*) is displayed that indicates to the inmate that the "application" (i.e., the HomeWAV system) is loading.

When the loading is complete, the Inmate sees screen 370 (FIG. 3*h*). This is the home screen from which all inmate initiated HomeWAV visitation tasks are managed.

The device 100*x* is constrained via hardware, software, firmware, or by other means believed to be known to those of skill in the art such that the only options that an inmate may choose are displayed on screen 370. The four options are: 1) viewing received video messages 388; 2) creating and sending a video message 390; 3) initiating a video visit with an authorized visitor 392; and 4) initiating a VoIP phone call to an authorized visitor 394. The inmate selects the desired action by touching the appropriate controls on the screen of device 100*x*.

Screen 370 presents the inmate a list of visitors 386 who have registered and prepaid for minutes for visitation with that particular inmate. The co-pending '498 application includes a complete discussion of visitor registration and payment procedure. Consequently, neither visitor registration nor payment procedures are further discussed herein.

An "Indicator Key" link 372, when selected, produces pop-up box 374. Pop-up box 374 shows the definitions of all possible colors of indicator(s) 376. Selecting control 378 removes pop-up box 374 from the screen.

The message "Welcome "John Doe" (the actual inmate name is displayed) 380 is displayed at the top of the screen 370. A logout control 382 near the upper right corner of screen 370, when activated, logs the inmate out of the HomeWAV system.

A "Test your audio and video" button 396 allows the inmate to test the operational readiness of his or her device 100*x* and to ensure that audio volume is properly adjusted.

One or more lines of information 384 (only one line shown for simplicity) give the inmate the current status of all potential (i.e., registered) visitors. When multiple potential visitors are registered, a line for each such visitor is displayed. The scrolling functions of device 100x are used to select and highlight the desired visitor with whom the inmate wishes to communicate.

The Visitor Name 386 is shown adjacent status indicator 376. Four option buttons 388, 390, 392, 394 allow the inmate to "View Messages", "Send Message", "Send Video Call", and "Send Audio Call", respectively.

A message 398, typically provided in both English and Spanish, reminds the inmate that any audio call or video visit may be monitored and/or recorded.

Selecting "View Messages" control 388 causes screen 400 (FIG. 3i) to be displayed. A status line 406 displays which of the saved messages is currently being displayed.

A central portion of screen 400 displays an image 408 originated by the person leaving the message being viewed.

Volume level may be adjusted using control 410.

Play button 412, Pause button 414, and Next Message button 416 each perform the indicated action.

Pressing Exit button 404 returns the inmate to home screen 370.

Another action selectable from home screen 370 is to record and send a video message. This is accomplished using the Send Messages button 390. Pressing Send Messages button 390 causes screen 420 (FIG. 3j) to be displayed. It should be noted that the message will be sent to the visitor previously selected on screen 370.

The name 422 of the visitor to whom the inmate is sending a message is displayed near the top of screen 420. Again, Exit button 404 returns the inmate to home screen 370.

An image 424 of the inmate creating the message is displayed in a central portion of screen 420.

Microphone level is adjustable using control 410.

Two action buttons, Cancel 426 and Record 428 are used to control the recording of a message to be sent.

Selecting record button 428 causes screen 430 (FIG. 3k) to be displayed.

Most of screen 430 needs no additional explanation as it is in large part a replication of screen 420 previously discussed.

A status message 436 indicates the amount of recording time remaining during which the inmate must complete his or her recording.

Two action buttons, Stop Recording 432 and Cancel 434 perform the indicated functions. Selection of the Stop Recording button 432 causes screen 440 (FIG. 3l) to be displayed.

Screen 440 allows the inmate to select several functions related to the just-recorded message. He or she may choose to re-record the message by selecting Re-record button 442. When selected, Re-record button 442 returns the inmate back to screen 420 where he or she may re-record his or her message.

Send button 444 sends the message to the selected visitor and, once sent, the inmate is returned to home screen 370.

Review button 446 allows the inmate to play back his or her message.

Cancel button 448 discards any recorded message and return the inmate to home screen 370.

Once back at home screen 370 the inmate may select another action.

The inmate may initiate a video visit to the selected visitor by pressing Send Video Call control 392. When Send Video Call control 392 is selected, screen 450 (FIG. 3m) is displayed and the call to the selected visitor is initiated. The status message 452 indicates that the visit is started.

Message 454 indicates the name of the visitor being called 456 and the number of rings 460.

Cancel button 458 terminates the calling process.

Assuming the visitor being called 456 answers, screen 470 (FIG. 3n) is then displayed.

A hang up control 472 is used to terminate the call. Video 474 captured by camera 102a (FIG. 1) of device 100x is displayed in a left panel of screen 470.

Visitor originated video 476 is displayed in a right panel of screen 470.

The maximum time remaining for the visit 478 is displayed above the upper right hand corner of visitor originated video 476. The maximum time for a visit may be a prison-imposed time maximum or may indicate the number of prepaid minutes remaining in an inmate's account.

At the conclusion of the call, either the inmate or the visitor may hang up, control 472. The inmate is then returned to home screen 370.

Finally, an inmate may initiate a VoIP call to a selected visitor by selecting "Send Audio Call" button 394. Selecting button 394 causes screen 480 (FIG. 3o) to be displayed.

A status message "Call Started" 482 is displayed.

A message 484 Calling "Jane Smith" (actual visitor's name is shown) 486 and a count of the rings 490 is also displayed.

A Cancel button 488 is used to terminate the calling process.

When the visitor being called answers, screen 500 (FIG. 3p) is displayed. The telephone icon 504 remains on the screen for the duration of the call. A Hang Up control 502 is used to terminate the voice call.

Call time remaining 506 is displayed on screen 500 under telephone icon 504.

Inmate originated video messages, VoIP phone calls or video visits have been described hereinabove. Device 100x is also adapted and configured to directly receive visitor originated VoIP telecommunications and video visitations.

Such video visitations and/or VoIP telecommunications are received directly by the inmate without any intervention by prison personnel.

A visitor who has been registered by the prison and who has placed funds in an account associated with the inmate with whom he or she wishes to visit logs into the HomeWAV system from his or her computer. As mentioned hereinabove, the term computer is used herein to represent any device capable of VoIP and/or video communication with the HomeWAV system.

Figure 4A:
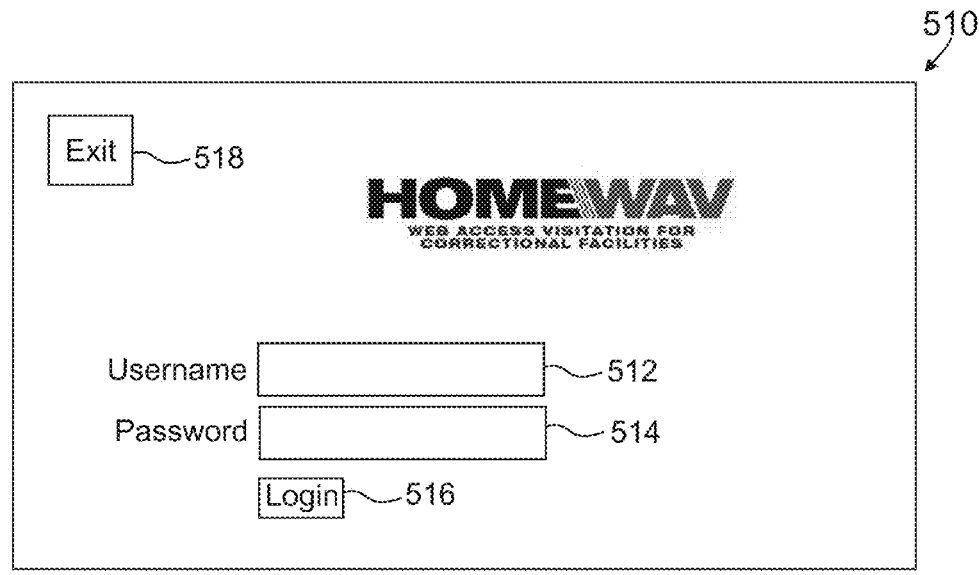
FIG. 4a is a screen shot of a visitor's login process.

The visitor station displays a login screen 510 (FIG. 4a) and is requested to enter his or her user name 512 and password 514. User name and password were previously established during a visitor registration process described in the co-pending '498 application. Consequently, the registration process is not further described or discussed herein.

Once the user name 512 and password 514 are entered, the visitor selects the Login button 516 to log into the HomeWAV system. Alternately if the user wishes to terminate the process, he or she selects the Exit button 518.

Figure 4D:
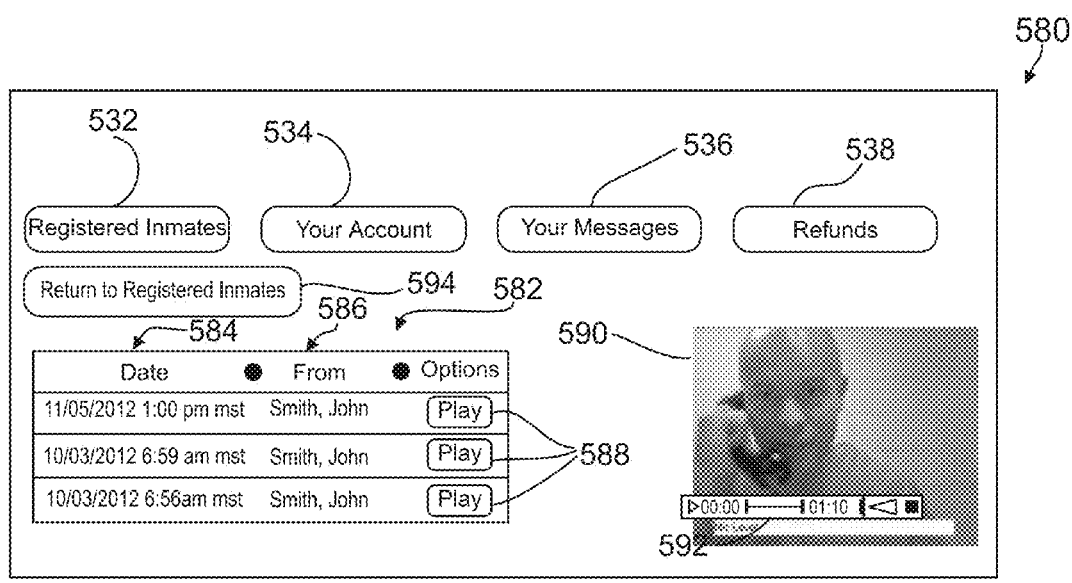
FIG. 4d is a screen shot of a visitor's view and play messages process.
Figure 4B:
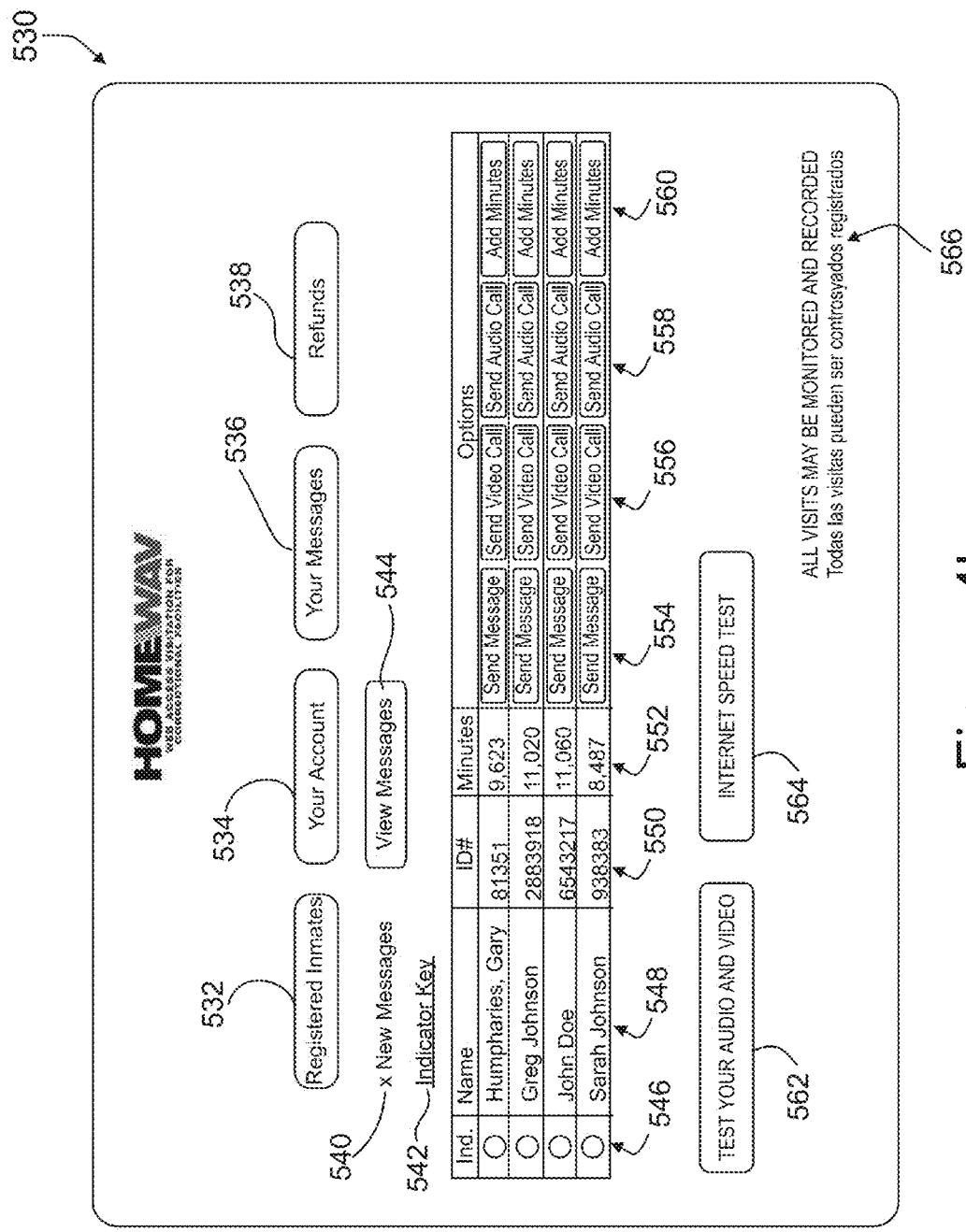
FIG. 4b is a screen shot of the Registered Inmate screen.

Upon logging in, the user is presented with screen 530 (FIG. 4b), the Registered Inmates Screen. All visitor actions are initiated from screen 530.

Figure 4C:
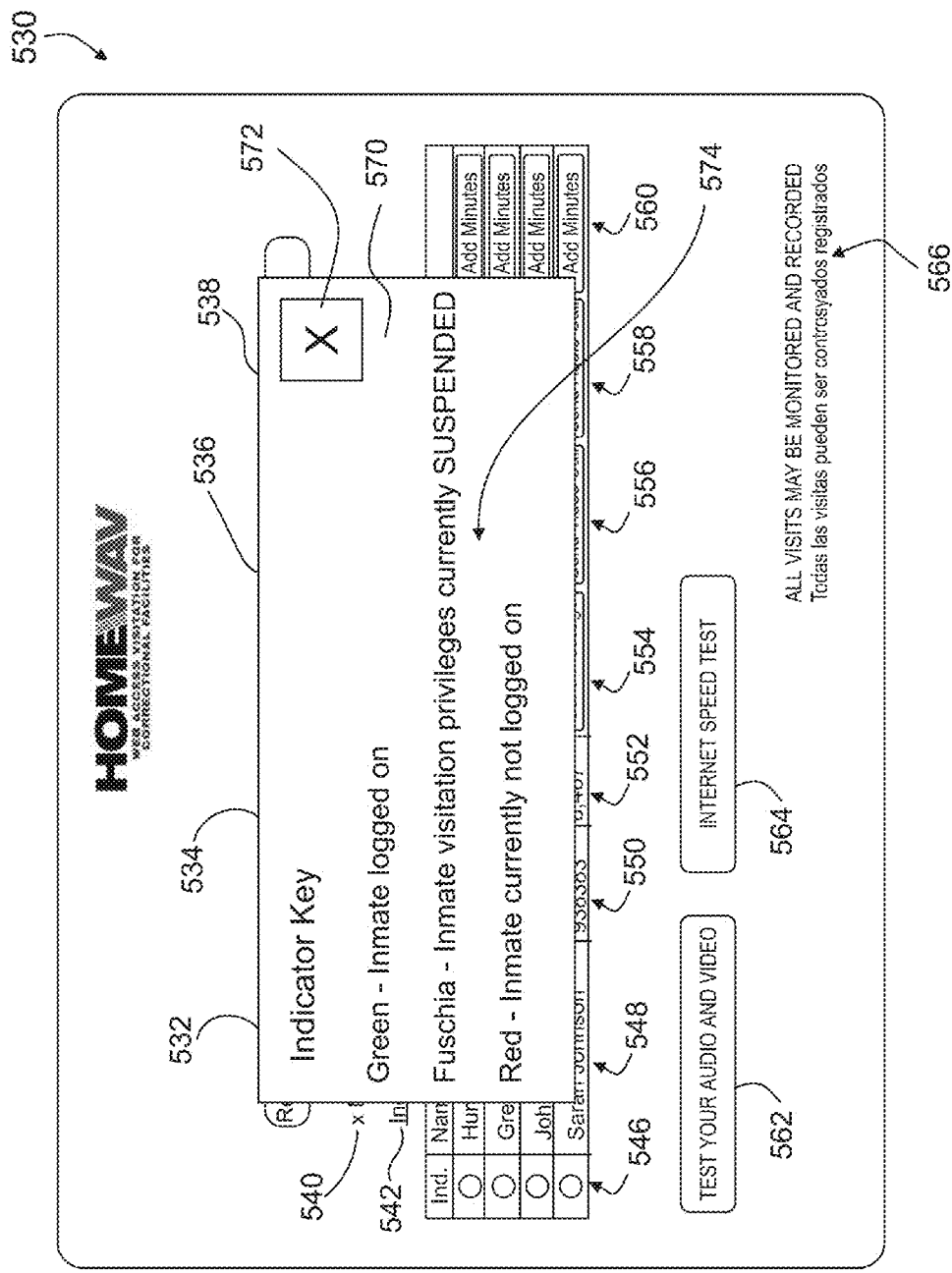
FIG. 4c is a screen shot of the Registered Inmate screen of FIG. 4b with a pop-up window displayed.

An "Indicator" link 542, when selected, causes a pop-up box 570 to appear. Pop-up box is shown in FIG. 4c overlying screen 530. Pop-up box 570 provides definitions 574 of colors displayed in an Indicator (Ind.) field 546 on screen 530. A green indicator shows that an inmate is logged into the HomeWAV system. A fuchsia indicator shows that the particular inmate has had his or her privileges suspended and is unavailable for either a video visit or VoIP telecommunication. A red indicator shows that the particular inmate is currently not logged into the HomeWAV system. Pop-up screen 570 is closed by selecting the close button 572.

One of the selectable actions available to the registered visitor is to view messages received from an inmate. A "New Messages" shows a count 540 of messages received but not yet viewed by the visitor. Pressing the "View Messages" button 544 causes a "View Incoming Messages" screen 580 (FIG. 4d) to be displayed.

Screen 580 shows a list 582 of received messages. Each message has a date & time stamp 584, an inmate name 586, and an associated "Play" button 588.

Selecting a "Play" button 588 associated with the message desired to be played displays the message in a display window 590. A playback control panel 590 controls playback control using standard symbols believed to be universally known. Playback control panel 592 typically contains "Stop" and "Play" control, a "Speaker Volume Control", and "Elapsed Time Display", etc. None of these playback controls are individually identified. It will be recognized that other control may be added or some existing controls may be removed. Consequently, the invention is not considered limited to a particular set of playback controls. Rather, the invention is intended to include any combination of playback controls.

Each video message received may be viewed a predetermined number of times after which it will be automatically erased from the System. The number of times is typically chosen by the system operator (i.e., HomeWAV).

When a visitor has played all messages of interest, selecting "Return to Registered Inmates" control 594 returns the user to Registered Inmates Screen 530.

For each inmate name 548, four action buttons are provided: "Send Message", "Send Video Call", "Send Audio Call", And "Add Minutes".

When the visitor selects the "Send Message" button 554, screen 600 (FIG. 4e) is presented. An image 602 of the visitor is displayed and two recording controls "Record Message" 604 and "Review Message" 606 may be selected by the visitor. When "Record Message" button 604 is selected, screen 620 (FIG. 4f) replaces screen 600. Screen 620 is similar to screen 600 except that the recording controls now consist of "Stop Recording" 622 and "Review Recording" 606. A status line 624 displays a message that a recording is in process and the time remaining for the recorded message.

Figure 4G:
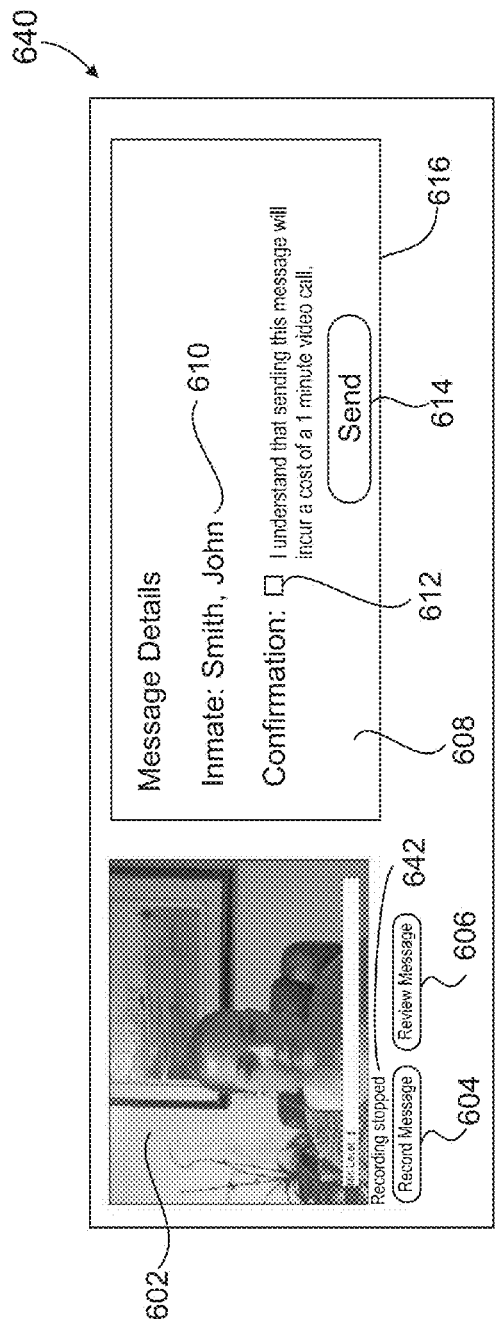

Upon selecting the "Stop Recording" control 622, a third screen, screen 640 (FIG. 4g) is displayed. Screen 640 is similar to both screen 600 and 620. Recording controls again consist of "Record Message" 604 and "Review Recording" 606. A status line 642 shows that the recording process is stopped.

All of the screens 600, 620, and 640 have a message details box 616 that displays the name of the inmate selected to receive the message, 610. In addition, a "Send" button is included to actually send the message to the inmate 610. However, before the message is sent, the visitor must acknowledge that the cost of sending the message will be the cost of one video minute. The user acknowledges this by clicking check box 612. Once acknowledged, the message is sent when the "Send" button is selected.

Once the message is sent, the visitor is returned to the Registered Inmates Screen 530.

Figure 4H:
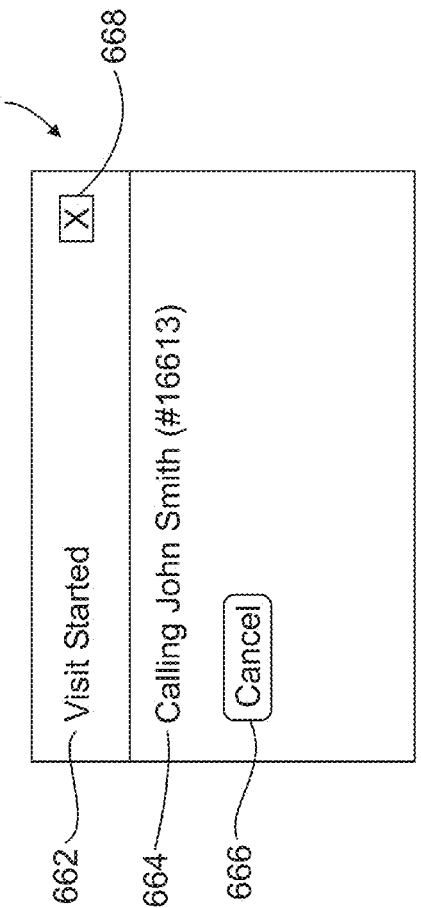
FIG. 4h is a screen shot of the process whereby a visitor initiates a video visit.

If the visitor wishes to initiate a video visit, he or she selects "Send Video Call" 556 and a new screen 660 (FIG. 4h) is presented.

Screen 660 displays a status message "Visit Started" 662. In addition, another status message 666 displays the name of the inmate being called.

A Cancel button 666 may be selected to cancel the establishment of a video visit. An additional control 668 likewise cancels the establishment of a video visit.

If cancelled, the visitor is returned to the Registered Inmates Screen 530.

Figure 4I:
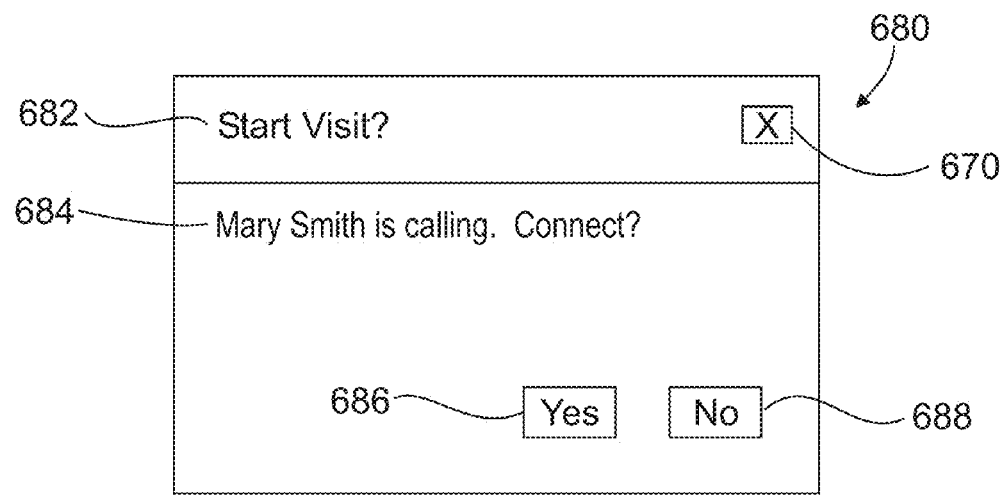
FIG. 4i is a screen shot of an inmate's alert screen that a visitor is attempting to initiate a video visit.

If the device 100x in possession of the inmate being called is turned on and, assuming that the inmate's privileges have not been suspended, inmate's device 100x displays screen 680 (FIG. 4i).

Screen 680 displays the message "Start Visit" 682. A message "Mary Smith is calling. Connect?" 684 is also displayed. The inmate must use either "Yes" button 686 or "No" button 688 to either accept or reject the visit, respectively. A control 670 also declines the visit and returns the inmate's device to its home screen 370 (FIG. 3h).

Figure 4J:
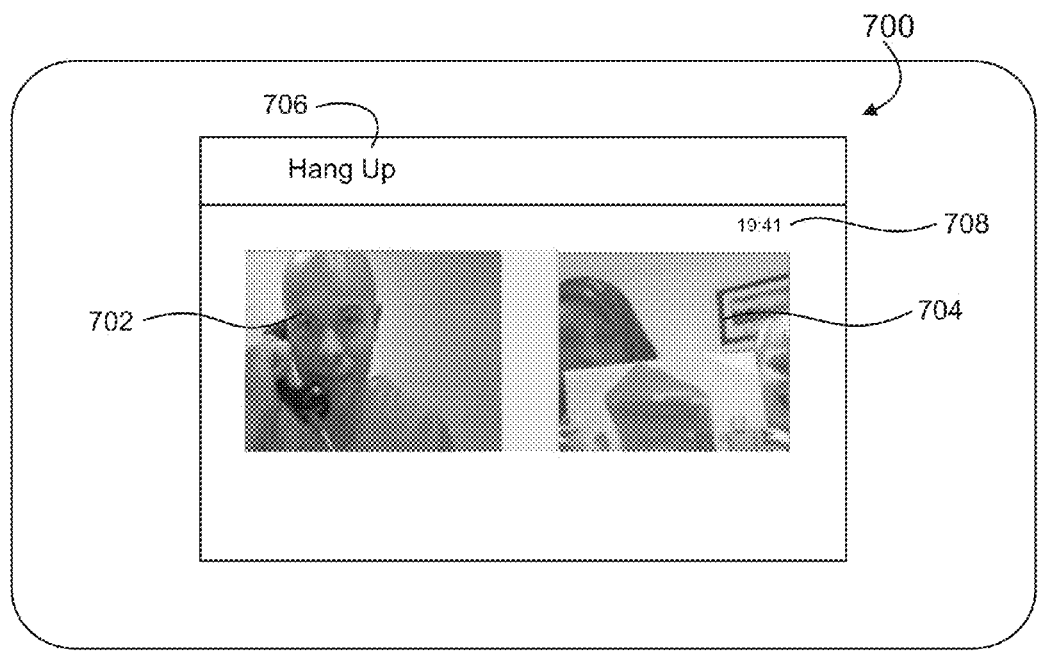
FIG. 4j is a screen shot of a video visit from the visitor's point of view.

If the inmate chooses to accept the visit by selecting the "Yes" button 686 screen 700 (FIG. 4j) is displayed on the visitors screen. Screen 6700 displays images of the inmate being called and the visitor at reference numbers 702, 704, respectively. The maximum time remaining for the visit 708 is also displayed. The visit may be terminated by the visitor by selecting the "Hang Up" control 706. When the video visit is complete, the visitor is returned to the "Registered Inmates Screen" 530.

Figure 4K:
FIG. 4k is a screen shot of the process whereby a visitor initiates a VoIP telecommunication.

A visitor may initiate a VoIP telecommunication with the selected inmate by selecting a "Send Audio Call" button 558 associated with the desired inmate from the Registered Inmates Screen 530. Upon selecting the "Send Audio Call" button 558, screen 720 (FIG. 4k) is presented. Screen 720 indicates that the call is started 722. A message "Calling Smith, John" 724 is also displayed. A ring count 728 shows the number of times the inmate's phone has rung. A "Cancel" button 726 may be used by the visitor to terminate the call. Another control 730 also terminates the calling attempt and returns the visitor to the "Registered Inmates Screen" 530.

Figure 4L:
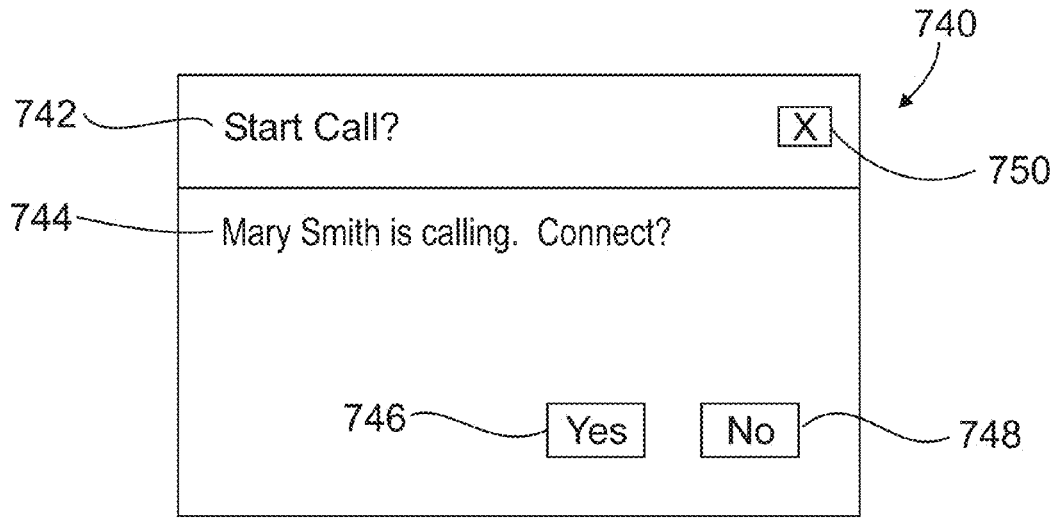
FIG. 4l is a screen shot of an inmate's alert screen that a visitor is attempting to initiate a VoIP telecommunication.

If the device 100x in possession of the inmate being called is turned on and, assuming that the inmate's privileges have not been suspended, screen 104 of inmate's device 100x displays screen 740 (FIG. 4l).

Screen 740 displays the message "Start Call? 742. A message "Mary Smith is calling. Connect?" 744 is also displayed. The inmate must use either "Yes" button 746 or "No" button 748 to either accept or reject the call, respectively. A control 750 also declines the call a returns the inmate's device to its home screen 370 (FIG. 3h).

Figure 4M:
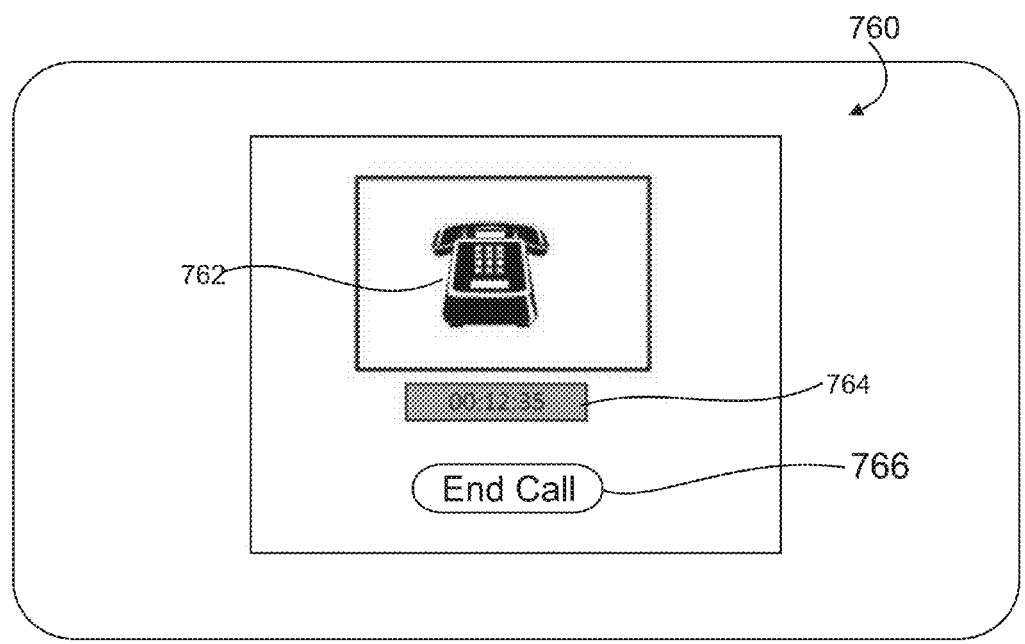
FIG. 4m is a screen shot of a VoIP telecommunication screen from the point of view of the visitor.

If the inmate chooses to accept the call by selecting the "Yes" button 746 screen 760 (FIG. 4m) is displayed on the visitors screen. A telephone icon 762 remains on the visitor's screen for the duration of the call.

The call duration 764 is displayed on the visitor's screen 760.

An "End Call" button 766 provides a mechanism whereby the visitor may terminate the call.

When the VoIP call is ended, the visitor is returned to the Registered Inmate Screen 530.

Finally, the visitor may add funds to an account associated with a particular inmate. By selecting the "Add Minutes" button 560 associated with the particular inmate, the new screen 780 is displayed on the visitor's screen. Screen 780 has two portions, a HomeWAV order portion 782 and a PayPal payment portion 784.

Screen 784 displays "Minutes to visit with Smith, John" 786. The price per minute (i.e., Item price) 788, usually set by the system operator, is also displayed.

The visitor enters the number of minutes he or she wishes to purchase in a quantity box 790. Selecting the "Update" link 792 updates the Item Total 793.

A Shipping and Handling charge 794 may be imposed by the system operator. In the case chosen for purposes of disclosure, the Shipping and Handling charge 794 is $0.50.

Finally, the total for the transaction 798 is displayed.

The only way to add funds to an inmate's visitation account is by using an on-line payment service. The well known PayPal® has been chosen for purposes of disclosure. Those of skill in the art will recognize that other on-line payment services exist, any suitable one of which may be substituted for PayPal®. Consequently, the invention is intended to include any suitable on-line payment service. Consequently, the invention is not considered limited to the PayPal® on-line payment service chosen for purposes of disclosure.

Assuming the visitor has previously set up a PayPal account, he or she enters an e-mail address 800 and a password 802, and selects the Login button to sign in to their PayPal® account. Once signed in the financial transaction is completed.

If the user does not already have a PayPal® account set up, the "Don't have a PayPal account?" link 808 is selected.

A "Cancel and return to HomeWAV, LLC". Link 810 terminates the Add Minutes operation.

At the conclusion of the "Add Minutes" process, the user is returned to the Registered Inmates Screen" 530.

The operation of the novel inmate visitation system of the present invention wherein either inmates or visitors may originate video visitations or VoIP telecommunications has been described in detail hereinabove. It will be recognized that the operation of the inventive system depends upon "infrastructure" described in detail in the '498 application. For that reason, some points regarding the information described and claimed in the '498 application are reiterated below.

As has been described in detail in the co-pending '498 application a prison administrator workstation (PAWS) may be located within the prison and also connected to either a network or directly to a network controller and/or switch. In alternate embodiments, the PAWS may have its own modem associated and connected directly to the Internet. Also the PAWS may be located outside the prison when desired.

An Internet connection is typically provided between Internet interface/modem and the Internet "cloud" represented schematically at reference number 214 in FIG. 2 of the '498 application.

A visitor workstation or Internet "appliance" also described in detail in the '498 application is also connected to Internet by a suitable Internet connection.

A HomeWAV, LLC website supports a web server. The web server runs application code that implements the applications of the novel remote web-based visitation system of the invention. In the embodiment chosen for purposes of disclosure, the applications, discussed in detail hereinbelow, are implemented in either JAVA or PHP (http://www.php.net). PHP is a server-side HTML embedded scripting language that provides web developers with a full suite of tools for building dynamic websites. In addition, some custom Adobe® Flash® ActionScript codes are provided to interact with flash.homeway.com discussed in detail in the '498 application. ActionScript is a dialect of ECMAScript (i.e., it is a superset of the syntax and semantics of the language more widely known JavaScript), and is used primarily for the development of websites and software targeting the Adobe Flash Player platform. ECMAScript is the scripting language standardized by Ecma International in the ECMA-262 specification and ISO/IEC 16262 specifications. The language is widely used for client-side scripting on the web.

It will be recognized that website design and implementation is believed to be well known to those of skill in the art. Consequently, alternate web development tools/languages may be utilized to develop similar applications. Consequently, the invention is not considered limited to the development tools and/or languages chosen for purposes of disclosure. Rather, the invention is intended to include any suitable languages, scripts, etc.

The HomeWAV, LLC website also embodies and supports storage provided to contain application code and the databases necessary to implement the remote web-based visitation system of the invention.

A second website associated with the remote web-based visitation system of the invention is Flash.HomeWAV.com website. Flash.HomeWAV.com website records and stores all audio/video (A/V) visits. As discussed in detail in the '498 application, certain A/V visits by clergy or legal representatives may be exempt from recording. Typically, all other A/V visits are recorded by one or more A/V servers. Storage devices retain A/V transcripts of all visits not exempt from the recording requirement.

Finally, one or more HomeWAV Administrators at workstations that include a computer and a modem that are connected to the Internet through an Internet connection provide certain gate keeping and administrative functions by interacting with HomeWAV website. Such gate keeping and administrative functions are also discussed in detail in the '498 application.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An Internet-based audio/video and VoIP telephone visitation system for prisons wherein audio/video and VoIP visitation may be originated by either an inmate or an outside visitor (visitation system), comprising:
  a) at least one portable electronic communications device (device) in exclusive possession of an inmate for sole use thereby, said device being connectable only to a visitation system, said portable electronic communications device comprising: a screen including a keypad, a video camera, a processor, an earphone jack, and a communications interface all operatively connected one to another, said communications interface being selectively operatively connected to said visitation system;
  b) an Internet-connected visitor station comprising a video display, a processor, a camera, a microphone, a speaker, and a network interface all operatively connected to said processor and software comprising computer instructions for managing an audio/video or VoIP telephonic visit by a preauthorized visitor with an inmate through said visitation system;
  c) an Internet-based administrative facility operatively connected to and communicative with the Internet for managing audio/video and VoIP telephonic interconnections of said portable electronic communications device in possession of said inmate and said Internet-connected visitor station, said Internet-based administrative facility comprising:

i) means for receiving funds exclusively from said preauthorized visitor through an Internet based payment service operatively connected to said Internet-based administrative facility, said funds used exclusively for visitation with said inmate;

ii) means for storing in a database information related to said inmate using said portable electronic communications device in possession of said inmate, said device, and said preauthorized visitor using said Internet-connected visitor station;

iii) means for creating an interconnection between said portable electronic communications device in possession of said inmate and said Internet-connected visitor station depending upon said information related to said inmate, said portable electronic communications device in possession of said inmate and said visitor, said interconnection forming one selected from the group: an audio/video visit, and a VoIP telephonic visit, said interconnection being established at the mutual convenience of said inmate and said registered visitor without prior scheduling and with no intervention required by prison personnel; and iv) means for timing said interconnection based on at least one selected from the group: an allowable maximum time for a visit, and a dollar amount of funds available to support said visit.

2. The Internet-based audio/video and VoIP telephone visitation system for prisons as recited in claim 1, wherein said device comprises one selected from the group: a smart phone, a tablet computer, and other portable electronic device.

3. The Internet-based audio/video and VoIP telephone visitation system for prisons as recited in claim 1, wherein said camera comprises a front-facing camera disposed to capture at least an image of said inmate while using said portable electronic communication device.

4. A method of using an Internet-based audio/video and VoIP telephone visitation system for prisons wherein audio/video and VoIP visitation may be originated by either an inmate or preauthorized outside visitor, the steps comprising:

a) providing an Internet-based audio/video and VoIP telephone visitation system (visitation system) for prisons wherein audio/video and VoIP visitation may be originated by either an inmate or an outside visitor, said visitation system comprising at least one portable electronic communications device in exclusive possession of an inmate for sole use thereby, said portable electronic communications device comprising a communications interface selectively being connectable only to said visitation system, and a visitor station connected to and communicative with the Internet;

b) using said visitation system to register at least one inmate incarcerated in a prison and recording information uniquely identifying said device in his or her exclusive possession, thereafter said inmate being a registered inmate;

c) registering at least one visitor authorized to visit with said at least one inmate using said visitation system, thereafter said visitor being a registered visitor;

d) using said visitation system to allow at least one of the group: said registered inmate and said registered visitor to perform one of the operations selected from the group: view a received video message from a non-selected one of said registered inmate and said registered visitor, record and send a video message to a non-selected one of said registered inmate and said registered visitor, initiate a video visitation with a non-selected one of said registered inmate and said registered visitor, and institute a VoIP telecommunication with a non-selected one of said registered inmate and said registered visitor, all without intervention by prison personnel.

5. The method of using the Internet-based audio/video and VoIP telephone visitation system for prisons as recited in claim 4 the steps further comprising:

e) providing an audio/video recording facility forming part of and operatively connected to said Internet-based audio/video and VoIP telephone visitation system; and f) using said audio/video recording facility to record at least a portion of one selected from the group: a video message, an audio/video visitation, and a VoIP telecommunication between said registered inmate and said registered visitor.

6. The method of using the Internet-based audio/video and VoIP telephone visitation system for prisons as recited in claim 5, the steps further comprising:

g) prior to said recording step (f), determining if said registered visitor is exempt from having his/her communication recorded selected from the group: a video message, an audio/video visitation, and a VoIP telecommunication recorded; and j) when said registered visitor is exempt from having his/her communication recorded, suppressing execution of said recording step (f).

7. The method of using the Internet-based audio/video and VoIP telephone visitation system for prisons as recited in claim 4, the steps further comprising:

e) automatically timing a duration one selected from the group: an audio/video visitation, and a VoIP telecommunication between said registered inmate and said registered visitor to provide an accumulated call time using said visitation system;

f) automatically comparing said accumulated call time to a predetermined maximum call time; and g) automatically terminating said one selected from the group: an audio/video visitation, and a VoIP telecommunication when said accumulated call time exceeds said predetermined maximum call time.

8. The method of using the Internet-based audio/video and VoIP telephone visitation system for prisons as recited in claim 7, the steps further comprising:

h) displaying at least one selected from the group: said accumulated time, and remaining time available on at least one selected from the group: said device in possession of said registered inmate, and a video monitor forming a part of said visitor station.

9. The method of using the Internet-based audio/video and VoIP telephone visitation system for prisons as recited in claim 4, the steps further comprising:

e) said at least one registered visitor making a payment to said visitation system, said payment being associated with a single one of said at least one registered inmates; and f) recording a value of said payment in a database associated with said visitor.

10. The method of using the Internet-based audio/video and VoIP telephone visitation system for prisons as recited in claim 9, wherein said making a payment step (e) comprises the sub-step of using an on-line payment system to make said payment.

* * * * *